United States Patent
Ueda

(10) Patent No.: US 8,883,110 B2
(45) Date of Patent: Nov. 11, 2014

(54) SYNTHETIC AMORPHOUS SILICA POWDER AND METHOD FOR PRODUCING SAME

(75) Inventor: Toshiaki Ueda, Iwaki (JP)

(73) Assignee: Mitsubishi Materials Corporation, Tokyo (JP)

( * ) Notice: Subject to any disclaimer, the term of this patent is extended or adjusted under 35 U.S.C. 154(b) by 328 days.

(21) Appl. No.: 13/520,807

(22) PCT Filed: Dec. 27, 2010

(86) PCT No.: PCT/JP2010/073499
§ 371 (c)(1),
(2), (4) Date: Jul. 6, 2012

(87) PCT Pub. No.: WO2011/083710
PCT Pub. Date: Jul. 14, 2011

(65) Prior Publication Data
US 2012/0299207 A1    Nov. 29, 2012

(30) Foreign Application Priority Data
Jan. 7, 2010   (JP) .................................. 2010-001793

(51) Int. Cl.
*C01B 33/158*   (2006.01)

(52) U.S. Cl.
CPC ........... *C01B 33/158* (2013.01); *C01P 2004/61* (2013.01); *C01P 2006/12* (2013.01); *C01P 2004/03* (2013.01); *C01P 2004/54* (2013.01); *C01P 2004/30* (2013.01)
USPC ................ 423/338; 423/335; 264/15; 264/80

(58) Field of Classification Search
None
See application file for complete search history.

(56) References Cited

U.S. PATENT DOCUMENTS

| | | | |
|---|---|---|---|
| 3,989,512 A | 11/1976 | Sayce | |
| 5,028,360 A * | 7/1991 | Ito et al. | ........................... 264/12 |
| 5,888,587 A | 3/1999 | Campion | |
| 7,662,363 B2 * | 2/2010 | Stanier et al. | ................... 424/49 |
| 7,931,836 B2 * | 4/2011 | Xie et al. | ......................... 264/15 |
| 2005/0129603 A1 | 6/2005 | Szillat et al. | |
| 2010/0178509 A1 * | 7/2010 | Schumacher et al. | ........ 428/402 |

FOREIGN PATENT DOCUMENTS

CN    1712352 A    12/2005
(Continued)

OTHER PUBLICATIONS

International Search Report dated Mar. 22, 2011, issued for PCT/JP2010/073499.
Office Action dated Oct. 29, 2013, issued for the Chinese patent application No. 201080059159.0 and English translation thereof.

(Continued)

*Primary Examiner* — Mary F Theisen
(74) *Attorney, Agent, or Firm* — Edwards Wildman Palmer LLP

(57) ABSTRACT

The synthetic amorphous silica powder of the present invention is characterized in that it comprises a synthetic amorphous silica powder obtained by applying a spheroidizing treatment to a granulated silica powder, and by subsequently cleaning and drying it so that the synthetic amorphous silica powder has an average particle diameter $D_{50}$ of 10 to 2,000 µm; wherein the synthetic amorphous silica powder has: a quotient between 1.35 exclusive and 1.75 inclusive obtained by dividing a BET specific surface area of the powder by a theoretical specific surface area calculated from the average particle diameter $D_{50}$; a real density of 2.10 to 2.20 g/cm³; an intra-particulate porosity of 0 to 0.05; a circularity between 0.50 inclusive and 0.75 inclusive; and a spheroidization ratio between 0.20 inclusive and 0.55 exclusive.

13 Claims, 7 Drawing Sheets

(56) References Cited

FOREIGN PATENT DOCUMENTS

| | | | |
|---|---|---|---|
| JP | 62-176929 | A | 8/1987 |
| JP | 03-275527 | A | 12/1991 |
| JP | 04-075848 | A | 3/1992 |
| JP | 06-191823 | A | 7/1994 |
| JP | 06-287012 | A | 10/1994 |
| JP | 2004-225135 | A | 8/2004 |
| JP | 2005-531475 | A | 10/2005 |
| JP | 2009-173461 | A | 8/2009 |

OTHER PUBLICATIONS

Hongyun Jin et al., "Preparation of spherical silica powder by oxygen-acetylene flame spheroidization process," Journal of Materials Processing Technology, vol. 210, No. 1, Jan. 1, 2010, pp. 81-84.

Supplementary Partial European Search Report dated May 14, 2014, issued for the European patent application No. 10842221.3.

Office Action dated Aug. 5, 2014, issued for the corresponding Chinese patent application No. 201080059159.0 and English translation thereof.

* cited by examiner

SYNTHETIC AMORPHOUS SILICA POWDER AND METHOD FOR PRODUCING SAME

CROSS REFERENCE TO RELATED APPLICATIONS

This application is related to two co-pending applications: "SYNTHETIC AMORPHOUS SILICA POWDER AND METHOD FOR PRODUCING SAME" filed even date herewith in the name of Toshiaki Ueda as a national phase entry of PCT/JP2010/073291 filed Dec. 24, 2010 and "SYNTHETIC AMORPHOUS SILICA POWDER AND METHOD FOR PRODUCING SAME" filed even date herewith in the name of Toshiaki Ueda as a national phase entry of PCT/JP2010/073287 filed Dec. 24, 2010; which applications are assigned to the assignee of the present application and both incorporated by reference herein.

TECHNICAL FIELD

The present invention relates to a synthetic amorphous silica powder with high purity and a method for producing the same, which silica powder is suitable as a raw material for manufacturing a synthetic silica glass product such as a piping, crucible, or the like to be used in a high temperature and reduced pressure environment in a semiconductor industry and the like.

BACKGROUND ART

Conventionally, crucibles, jigs, and the like to be used for single crystal production in semiconductor application have been manufactured from a quartz powder as a raw material obtained by pulverizing and purifying a natural quartz, quartz sand, or the like. However, the natural quartz, quartz sand, or the like contains various metal impurities which are not completely removed therefrom even by the purification treatment, so that the thus obtained raw material has not been fully satisfied in purity. In turn, progression of high integration of semiconductors has led to a more enhanced quality demand for single crystals as materials for the semiconductors, so that crucibles, jigs, and the like to be used for producing the single crystals are also demanded to have high purities, respectively. As such, attention has been directed to a synthetic silica glass product obtained by adopting, as a raw material, a synthetic amorphous silica powder with high purity instead of a natural quartz, quartz sand, or the like.

As a method for producing such a synthetic amorphous silica powder with high purity, there has been disclosed a method where silicon tetrachloride with high purity is hydrolyzed with water, and the generated silica gel is dried, sized, and fired, to obtain a synthetic amorphous silica powder (see Patent Document 1, for example). Further, methods have been disclosed each configured to hydrolyze an alkoxysilane such as silicate in the presence of acid and alkali to thereby gelate the alkoxysilane, and to dry and pulverize the obtained gel, followed by firing to thereby obtain a synthetic amorphous silica powder (see Patent Documents 2 and 3, for example). The synthetic amorphous silica powders produced by the methods described in the Patent Documents 1 to 3, respectively, are highly pure as compared to a natural quartz, quartz sand, and the like, thereby exemplarily enabling to: decrease entrained impurity contaminations in synthetic silica glass products such as crucibles, jigs, and the like manufactured from such synthetic amorphous silica powders as raw materials, respectively; and enhance performances of the products, respectively.

PRIOR ART DOCUMENT

Patent Document

Patent Document 1: Japanese Patent Publication No. 4-75848 (Claim 1)
Patent Document 2: Japanese Patent Application Laid-Open Publication No. 62-176929 (Claim 1)
Patent Document 3: Japanese Patent Application Laid-Open Publication No. 3-275527 (page 2, lower left column, line 7 to page 3, upper left column, line 6)

DISCLOSURE OF THE INVENTION

Problem to be Solved by the Invention

However, those synthetic silica glass products manufactured from the synthetic amorphous silica powders as raw materials produced by the methods described in the Patent Documents 1 to 3, respectively, each have a drawback that the applicable synthetic silica glass product generates gas bubbles or the gas bubbles are expanded when the synthetic silica glass product is used in a high temperature and reduced pressure environment, in a manner to considerably deteriorate the performance of the synthetic silica glass product.

For example, crucibles for silicon single crystal pulling are each used in an environment at a high temperature of about 1,500° C. and at a reduced pressure of about 7,000 Pa, such that the considerable deterioration of a performance of the crucible due to the aforementioned generation or expansion of gas bubbles has been a problem affecting a quality of a pulled single crystal.

Against the above problem to be brought about upon usage in a high temperature and reduced pressure environment, it is conceivable to conduct such a countermeasure to lower a concentration of those impurities in a synthetic amorphous silica powder which possibly act as gas components: by applying a heat treatment to a synthetic amorphous silica powder obtained by hydrolysis of silicon tetrachloride, to thereby decrease respective concentrations of hydroxyl group and chlorine in the synthetic amorphous silica powder; or, by applying a heat treatment to a synthetic amorphous silica powder obtained from alkoxysilane by a sol-gel method, to thereby decrease respective concentrations of hydroxyl group and carbon in the synthetic amorphous silica powder.

However, even by the above countermeasure, it is impossible to sufficiently restrict generation or expansion of gas bubbles in a synthetic silica glass product to be used in a high temperature and reduced pressure environment.

It is therefore an object of the present invention to provide a synthetic amorphous silica powder and a method for producing the same, which silica powder overcomes the conventional problem and is suitable as a raw material for manufacturing a synthetic silica glass product which is less in amount of generation or degree of expansion of gas bubbles even upon usage of the product in a high temperature and reduced pressure environment.

Means for Solving Problem

The first aspect of the present invention resides in a synthetic amorphous silica powder obtained by applying a spheroidizing treatment to a granulated silica powder, and by subsequently cleaning and drying it so that the synthetic amorphous silica powder has an average particle diameter $D_{50}$ of 10 to 2,000 μm; characterized in that the synthetic amorphous silica powder has:

a quotient between 1.35 exclusive and 1.75 inclusive obtained by dividing a BET specific surface area of the powder by a theoretical specific surface area calculated from the average particle diameter $D_{50}$;

a real density of 2.10 to 2.20 g/cm$^3$;

an intra-particulate porosity of 0 to 0.05;

a circularity between 0.50 inclusive and 0.75 inclusive; and a spheroidization ratio between 0.20 inclusive and 0.55 exclusive.

The second aspect of the present invention resides in an invention based on the first aspect, characterized that the synthetic amorphous silica powder is obtained by applying the spheroidizing treatment to the granulated silica powder after firing it; and that the synthetic amorphous silica powder satisfies one or both of the conditions that it has a carbon concentration less than 2 ppm and that it has a chlorine concentration less than 2 ppm.

The third aspect of the present invention resides in an invention based on the second aspect, characterized in that the granulated silica powder is a silica powder obtained by: hydrolyzing silicon tetrachloride to produce a siliceous gel; drying the siliceous gel to turn it into a dry powder; pulverizing particles of the dry powder; and then classifying the pulverizedly obtained particles; and that the synthetic amorphous silica powder has a carbon concentration less than 2 ppm.

The fourth aspect of the present invention resides in an invention based on the second aspect, characterized in that the granulated silica powder is a silica powder obtained by: hydrolyzing an organic silicon compound to produce a siliceous gel; drying the siliceous gel to turn it into a dry powder; pulverizing particles of the dry powder; and then classifying the pulverizedly obtained particles; and that the synthetic amorphous silica powder has a chlorine concentration less than 2 ppm.

The fifth aspect of the present invention resides in an invention based on the second aspect, characterized in that the granulated silica powder is a silica powder obtained by: using a fumed silica to produce a siliceous gel; drying the siliceous gel to turn it into a dry powder; pulverizing particles of the dry powder; and then classifying the pulverizedly obtained particles; and that the synthetic amorphous silica powder has a carbon concentration less than 2 ppm and a chlorine concentration less than 2 ppm.

The sixth aspect of the present invention resides in a method for producing a synthetic amorphous silica powder, comprising, in the recited order:

a granulating step for producing a siliceous gel, drying the siliceous gel to turn it into a dry powder, pulverizing particles of the dry powder, and then classifying the pulverizedly obtained particles to thereby obtain a silica powder;

a spheroidizing step based on a thermal plasma for delivering, at a predetermined supplying rate, particles of the silica powder obtained in the granulating step into a plasma torch in which a plasma is generated by a predetermined high-frequency power, in a manner to heat the particles at a temperature from 2,000° C. to a boiling point of silicon dioxide, thereby melting the particles;

a cleaning step for removing fine particles attached to surfaces of the spheroidized silica powder particles after the spheroidizing step; and a drying step for drying the silica powder particles after the cleaning step;

wherein the spheroidizing step is conducted by adjusting a value of A/B (W·hr/kg) to between $3.0 \times 10^3$ inclusive and $1.0 \times 10^4$ exclusive, where A is the high-frequency power (W), and B is the supplying rate (kg/hr) of the silica powder, thereby obtaining a synthetic amorphous silica powder having:

an average particle diameter $D_{50}$ of 10 to 2,000 μm;

a quotient between 1.35 exclusive and 1.75 inclusive obtained by dividing a BET specific surface area of the powder by a theoretical specific surface area calculated from the average particle diameter $D_{50}$;

a real density of 2.10 to 2.20 g/cm$^3$;

an intra-particulate porosity of 0 to 0.05;

a circularity between 0.50 inclusive and 0.75 inclusive; and a spheroidization ratio between 0.20 inclusive and 0.55 exclusive.

The seventh aspect of the present invention resides in an invention based on the sixth aspect, characterized in that the granulating step is a step for: hydrolyzing silicon tetrachloride to produce a siliceous gel; drying the siliceous gel to turn it into a dry powder; pulverizing particles of the dry powder; and then classifying the pulverizedly obtained particles, to obtain a silica powder having an average particle diameter $D_{50}$ of 10 to 3,000 μm.

The eighth aspect of the present invention resides in an invention, characterized in that the granulating step is a step for: hydrolyzing an organic silicon compound to produce a siliceous gel; drying the siliceous gel to turn it into a dry powder; pulverizing particles of the dry powder; and then classifying the pulverizedly obtained particles, to obtain a silica powder having an average particle diameter $D_{50}$ of 10 to 3,000 μm.

The ninth aspect of the present invention resides in an invention, characterized in that the granulating step is a step for: using a fumed silica to produce a siliceous gel; drying the siliceous gel to turn it into a dry powder; pulverizing particles of the dry powder; and then classifying the pulverizedly obtained particles, to obtain a silica powder having an average particle diameter $D_{50}$ of 10 to 3,000 μm.

The tenth aspect of the present invention resides in a method for producing a synthetic amorphous silica powder, comprising, in the recited order:

a granulating step for producing a siliceous gel, drying the siliceous gel to turn it into a dry powder, pulverizing particles of the dry powder, and then classifying the pulverizedly obtained particles to thereby obtain a silica powder;

a firing step for firing particles of the silica powder obtained in the granulating step, at a temperature of 800 to 1,450° C.;

a spheroidizing step based on a thermal plasma for delivering, at a predetermined supplying rate, particles of the silica powder obtained in the firing step into a plasma torch in which a plasma is generated by a predetermined high-frequency power, in a manner to heat the particles at a temperature from 2,000° C. to a boiling point of silicon dioxide, thereby melting the particles;

a cleaning step for removing fine particles attached to surfaces of the silica powder particles after the spheroidizing step; and a drying step for drying the silica powder particles after the cleaning step;

wherein the spheroidizing step is conducted by adjusting a value of A/B (W·hr/kg) to between $3.0 \times 10^3$ inclusive and $1.0 \times 10^4$ exclusive, where A is the high-frequency power (W), and B is the supplying rate (kg/hr) of the silica powder, thereby obtaining a synthetic amorphous silica powder having:

an average particle diameter $D_{50}$ of 10 to 2,000 μm;

a quotient between 1.35 exclusive and 1.75 inclusive obtained by dividing a BET specific surface area of the powder by a theoretical specific surface area calculated from the average particle diameter $D_{50}$;

a real density of 2.10 to 2.20 g/cm³;

an intra-particulate porosity of 0 to 0.05;

a circularity between 0.50 inclusive and 0.75 inclusive; and a spheroidization ratio between 0.20 inclusive and 0.55 exclusive; and wherein the synthetic amorphous silica powder satisfies one or both of the conditions that it has a carbon concentration less than 2 ppm and that it has a chlorine concentration less than 2 ppm.

The eleventh aspect of the present invention resides in an invention based on the tenth aspect, characterized in that, when the granulating step is a step for: hydrolyzing silicon tetrachloride to produce a siliceous gel; drying the siliceous gel to turn it into a dry powder; pulverizing particles of the dry powder; and then classifying the pulverizedly obtained particles, to obtain a silica powder having an average particle diameter $D_{50}$ of 10 to 3,000 μm, the obtained synthetic amorphous silica powder has a carbon concentration less than 2 ppm.

The twelfth aspect of the present invention resides in an invention based on the tenth aspect, characterized in that, when the granulating step is a step for: hydrolyzing an organic silicon compound to produce a siliceous gel; drying the siliceous gel to turn it into a dry powder; pulverizing particles of the dry powder; and then classifying the pulverizedly obtained particles, to obtain a silica powder having an average particle diameter $D_{50}$ of 10 to 3,000 μm, the obtained synthetic amorphous silica powder has a chlorine concentration less than 2 ppm.

The thirteenth aspect of the present invention resides in an invention based on the tenth aspect, characterized in that, when the granulating step is a step for: using a fumed silica to produce a siliceous gel; drying the siliceous gel to turn it into a dry powder; pulverizing particles of the dry powder; and then classifying the pulverizedly obtained particles, to obtain a silica powder having an average particle diameter $D_{50}$ of 10 to 3,000 μm, the obtained synthetic amorphous silica powder has a carbon concentration less than 2 ppm and a chlorine concentration less than 2 ppm.

Effect of the Invention

The synthetic amorphous silica powder according to the first aspect of the present invention is a synthetic amorphous silica powder obtained by applying a spheroidizing treatment to a granulated silica powder, and by subsequently cleaning and drying it so that the synthetic amorphous silica powder has an average particle diameter $D_{50}$ of 10 to 2,000 μm;

wherein the synthetic amorphous silica powder has:

a quotient between 1.35 exclusive and 1.75 inclusive obtained by dividing a BET specific surface area of the powder by a theoretical specific surface area calculated from the average particle diameter $D_{50}$;

a real density of 2.10 to 2.20 g/cm³;

an intra-particulate porosity of 0 to 0.05;

a circularity between 0.50 inclusive and 0.75 inclusive; and a spheroidization ratio between 0.20 inclusive and 0.55 exclusive.

Thus, by using this synthetic amorphous silica powder to manufacture a synthetic silica glass product, gas components adsorbed to surfaces of particles of a raw powder are less in amount and gas components inside the powder particles are also less in amount, thereby enabling to reduce an amount of generation or degree of expansion of gas bubbles.

The synthetic amorphous silica powder according to the second aspect of the present invention is obtained by applying the spheroidizing treatment to the granulated silica powder after firing it; wherein the synthetic amorphous silica powder satisfies one or both of the conditions that it has a carbon concentration less than 2 ppm and that it has a chlorine concentration less than 2 ppm. Thus, by using this synthetic amorphous silica powder to manufacture a synthetic silica glass product, gas components adsorbed to surfaces of particles of a raw powder are less in amount and gas components inside the powder particles are also less in amount, thereby enabling to reduce an amount of generation or degree of expansion of gas bubbles. Particularly, in case of this synthetic amorphous silica powder, firing is conducted before applying the spheroidizing treatment to the powder, so that gas components to be adsorbed to surfaces of powder particles and gas components inside the particles are extremely decreased in amount, thereby further enhancing an effect for reducing an amount of generation or degree of expansion of gas bubbles in the above synthetic silica glass product.

In case of the synthetic amorphous silica powder according to the fifth aspect of the present invention, the granulated silica powder is a silica powder obtained by: using a fumed silica to produce a siliceous gel; drying the siliceous gel to turn it into a dry powder; pulverizing particles of the dry powder; and then classifying the pulverizedly obtained particles; thereby achieving that the synthetic amorphous silica powder has a carbon concentration less than 2 ppm and a chlorine concentration less than 2 ppm.

In case of this synthetic amorphous silica powder, the granulated silica powder is further restricted in carbon concentration and chlorine concentration by using fumed silica as a silica powder as a raw powder, as compared to a granulated silica powder which uses, as a raw powder, a silica powder obtained by reacting a chlorine-based silicon compound in a liquid or a silica powder obtained from an organic silicon compound such as tetramethoxysilane; thereby further enhancing an effect for reducing an amount of generation or degree of expansion of gas bubbles in the synthetic silica glass product.

In the method for producing a synthetic amorphous silica powder according to the sixth to ninth aspects of the present invention, the siliceous gel is produced by hydrolyzing silicon tetrachloride, the siliceous gel is produced by hydrolyzing an organic silicon compound such as tetramethoxysilane, or the siliceous gel is produced by using fumed silica, for example. The method is characterized in that it comprises in the recited order:

a granulating step for drying the siliceous gel to turn it into a dry powder, pulverizing particles of the dry powder, and then classifying the pulverizedly obtained particles to thereby obtain a silica powder having a desired average particle diameter;

a spheroidizing step based on a thermal plasma for delivering, at a predetermined supplying rate, particles of the silica powder obtained in the granulating step into a plasma torch in which a plasma is generated by a predetermined high-frequency power, in a manner to heat the particles at a temperature from 2,000° C. to a boiling point of silicon dioxide, thereby melting the particles;

a cleaning step for removing fine particles attached to surfaces of the silica powder particles after the spheroidizing step; and a drying step for drying the silica powder particles after the cleaning step;

wherein the spheroidizing step is conducted by adjusting a value of A/B (W·hr/kg) to between $3.0 \times 10^3$ inclusive and $1.0 \times 10^4$ exclusive, where A is the high-frequency power (W), and B is the supplying rate (kg/hr) of the silica powder, thereby obtaining a synthetic amorphous silica powder having:

an average particle diameter $D_{50}$ of 10 to 2,000 μm;

a quotient between 1.35 exclusive and 1.75 inclusive obtained by dividing a BET specific surface area of the powder by a theoretical specific surface area calculated from the average particle diameter $D_{50}$;

a real density of 2.10 to 2.20 $g/cm^3$;

an intra-particulate porosity of 0 to 0.05;

a circularity between 0.50 inclusive and 0.75 inclusive; and a spheroidization ratio between 0.20 inclusive and 0.55 exclusive.

The synthetic amorphous silica powder is less in inevitable gas adsorption amount and less in gas components inside the powder particles by virtue of experience of the above steps, thereby enabling to expediently produce a synthetic amorphous silica powder which is preferably usable as a raw material of a synthetic silica glass product.

In the method for producing a synthetic amorphous silica powder according to the tenth to thirteenth aspects of the present invention, the siliceous gel is produced by hydrolyzing silicon tetrachloride, the siliceous gel is produced by hydrolyzing an organic silicon compound such as tetramethoxysilane, or the siliceous gel is produced by using fumed silica, for example. The method is characterized in that it comprises in the recited order:

a granulating step for drying the siliceous gel to turn it into a dry powder, pulverizing particles of the dry powder, and then classifying the pulverizedly obtained particles to thereby obtain a silica powder;

a firing step for firing particles of the silica powder obtained in the granulating step, at a temperature of 800 to 1,450° C.;

a spheroidizing step based on a thermal plasma for delivering, at a predetermined supplying rate, particles of the silica powder obtained in the firing step into a plasma torch in which a plasma is generated by a predetermined high-frequency power, in a manner to heat the particles at a temperature from 2,000° C. to a boiling point of silicon dioxide, thereby melting the particles;

a cleaning step for removing fine particles attached to surfaces of the spheroidized silica powder particles after the spheroidizing step; and a drying step for drying the silica powder particles after the cleaning step;

wherein the spheroidizing step is conducted by adjusting a value of A/B (W·hr/kg) to between $3.0 \times 10^3$ inclusive and $1.0 \times 10^4$ exclusive, where A is the high-frequency power (W), and B is the supplying rate (kg/hr) of the silica powder, thereby obtaining a synthetic amorphous silica powder having:

an average particle diameter $D_{50}$ of 10 to 2,000 μm;

a quotient between 1.35 exclusive and 1.75 inclusive obtained by dividing a BET specific surface area of the powder by a theoretical specific surface area calculated from the average particle diameter $D_{50}$;

a real density of 2.10 to 2.20 $g/cm^3$;

an intra-particulate porosity of 0 to 0.05;

a circularity between 0.50 inclusive and 0.75 inclusive; and a spheroidization ratio between 0.20 inclusive and 0.55 exclusive.

The synthetic amorphous silica powder is less in inevitable gas adsorption amount and less in gas components inside the powder particles by virtue of experience of the above steps, thereby enabling to expediently produce a synthetic amorphous silica powder which is preferably usable as a raw material of a synthetic silica glass product. Particularly, this production method is configured to provide the firing step under the predetermined condition before the spheroidizing step, in a manner to remarkably decrease amounts of gas components to be otherwise adsorbed on surfaces of powder particles and gas components to be otherwise present within the powder particles, thereby enabling to produce a synthetic amorphous silica powder which is higher in an effect for reducing an amount of generation or degree of expansion of gas bubbles in the synthetic silica glass product.

MODE(S) FOR CARRYING OUT THE INVENTION

The modes for carrying out the present invention will be explained hereinafter based on the accompanying drawings.

The synthetic amorphous silica powder according to a first embodiment of the present invention is obtained by applying a spheroidizing treatment to a granulated silica powder, and by subsequently cleaning and drying it. Further, the synthetic amorphous silica powder is characterized in that it has: a quotient between 1.35 exclusive and 1.75 inclusive obtained by dividing a BET specific surface area of the powder by a theoretical specific surface area calculated from the average particle diameter $D_{50}$; a real density of 2.10 to 2.20 $g/cm^3$; an intra-particulate porosity of 0 to 0.05; a circularity between 0.50 inclusive and 0.75 inclusive; and a spheroidization ratio between 0.20 inclusive and 0.55 exclusive.

Further, the synthetic amorphous silica powder according to the second embodiment of the present invention is a synthetic amorphous silica powder which is obtained by applying a spheroidizing treatment to a granulated silica powder after firing it. Thus, the synthetic amorphous silica powder satisfies one or both of the conditions that it has a carbon concentration less than 2 ppm and that it has a chlorine concentration less than 2 ppm.

Conceivable as a main source of generation or expansion of gas bubbles in a synthetic silica glass product such as a crucible for silicon single crystal pulling at a high temperature and a reduced pressure, is a gas adsorbed to surfaces of particles of a raw powder, which has been used for manufacturing a product. Namely, upon manufacturing a synthetic silica glass product, gas components adsorbed to surfaces of particles of the raw powder are desorbed therefrom upon melting of the particles as one step of manufacturing. Further, the thus desorbed gas components are left in the synthetic silica glass product, in a manner to act as a source of generation or expansion of gas bubbles.

Figure 7:
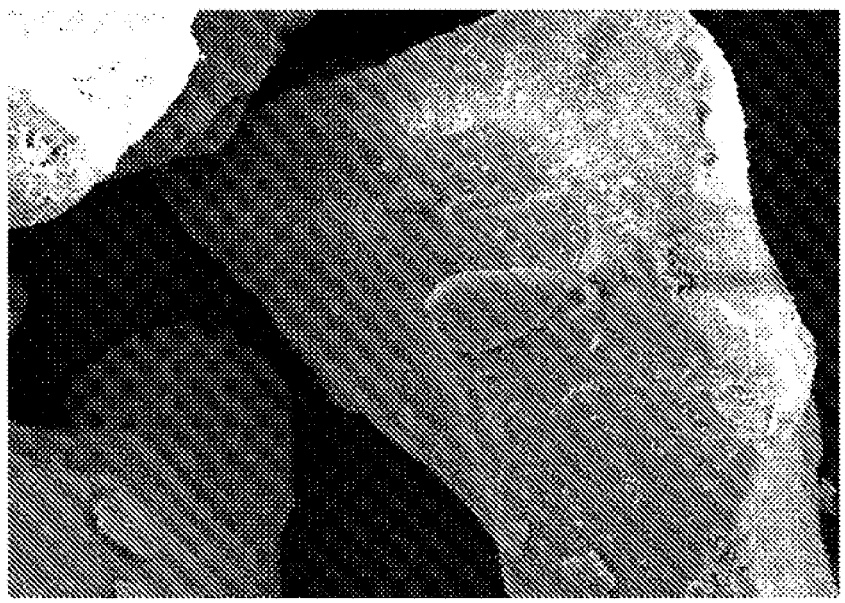
FIG. 7 is a photographic view of representative silica powder particles which are not subjected to a spheroidizing treatment.

It is typical, for a silica powder to be used as a raw material of a synthetic silica glass product, that the powder is passed through a pulverizing step, so that the silica powder contains numerous particles in indeterminate forms (pulverized powder particle forms), respectively, as shown in FIG. 7. Thus, the silica powder is considered to be increased in specific surface area, thereby increasing an inevitable gas adsorption amount.

As such, the synthetic amorphous silica powder of the present invention is made to have a quotient in the above range obtained by dividing a BET specific surface area of the powder by a theoretical specific surface area calculated from the average, particle diameter $D_{50}$, by applying the spheroidizing treatment to the powder. The BET specific surface area is a value measured by a BET three-point method. Further, it is possible to calculate a theoretical specific surface area of particles from the following equation (1), supposing that the particles are true spheres, respectively, and surfaces thereof are smooth. In the equation (1), D represents a diameter of a particle, and ρ represents a real density.

$$\text{Theoretical specific surface area} = 6/(D \times \rho) \quad (1)$$

In the present specification, the theoretical specific surface area of a powder is a value calculated from a theoretical real density, by assuming that D is an average particle diameter $D_{50}$ of the powder, and ρ is a real density of 2.20 g/cm³ in the following equation (1). Namely, the theoretical specific surface area of a powder is calculated from the following equation (2).

$$\text{Theoretical specific surface area of powder} = 2.73/D_{50} \quad (2)$$

Larger quotients obtained by dividing BET specific surface areas by theoretical specific surface areas calculated from average particle diameters $D_{50}$, lead to larger specific surface areas, thereby increasing inevitable gas adsorption amounts. Quotients of 1.35 or smaller lead to lower moldability of synthetic silica glass products such as quartz crucibles. In turn, quotients exceeding 1.75 lead to lower effects for reducing amounts of generation or degrees of expansion of gas bubbles. In the above, the quotient obtained by dividing the BET specific surface area by the theoretical specific surface area calculated from the average particle diameter $D_{50}$ is preferably within a range of 1.40 to 1.60.

Further, the synthetic amorphous silica powder has a circularity between 0.50 inclusive and 0.75 inclusive. The circularity means that powder particles approachingly resemble true spheres as the circularity approaches 1.00, and the circularity is calculated from the following equation (3).

$$\text{Circularity} = 4\pi S/L^2 \quad (3)$$

in the equation (3), S represents an area of a particle in a projection view, and L represents a perimeter of the particle in the projection view. In the present specification, the circularity of the powder is an average value of circularities of 200 powder particles calculated from the equation (3). Circularities of powder less than 0.50 lead to lower effects for reducing amounts of generation or degrees of expansion of gas bubbles. Circularities of powder exceeding 0.75 lead to lower moldability of synthetic silica glass products such as quartz crucibles. In the above, the circularity of the powder is preferably within a range of 0.60 to 0.70. Furthermore, the synthetic amorphous silica powder has a spheroidization ratio between 0.20 inclusive and 0.55 exclusive. The spheroidization ratio of a powder means a ratio at which those particles having circularities of 0.80 to 1.00 are contained in a powder in a predetermined amount. Spheroidization ratios less than 0.20 lead to lower effects for reducing amounts of generation or degrees of expansion of gas bubbles. Spheroidization ratios of 0.55 or more lead to lower moldability of synthetic silica glass products such as quartz crucibles. In the above, the spheroidization ratio of the powder is preferably within a range of 0.30 to 0.50.

Moreover, considering a single particle of the synthetic amorphous silica powder, it is preferable that the particle is free of presence of interior spaces therein such as voids, closed cracks, and the like. Namely, a space (s) present inside the particle of synthetic amorphous silica powder act(s) as a source of generation or expansion of gas bubbles in a synthetic silica glass product. As such, the real density is to be 2.10 g/cm³ or more, and preferably 2.15 to 2.20 g/cm³. The real density means an average value of true densities obtained by conducting a real density measurement three times in conformity to JIS R7212: Testing Methods for Carbon Blocks, (d) Measurement of absolute specific gravity. Further, the intra-particulate porosity is to be 0.05 or less, preferably 0.01 or less. The intra-particulate porosity means an average value calculated from the following equation (4) based on 50 powder particles, by measuring a cross-sectional area of each particle, and an area of a space in the particle, if present, upon observing the cross section of the particle by a SEM (scanning electron microscope):

$$\text{Intra-particulate porosity} = \text{total area of spaces in particles/total cross-sectional area of particles} \quad (4)$$

In turn, the average particle diameter $D_{50}$ of the synthetic amorphous silica powder is to be 10 to 2,000 μm, and preferably within a range of 50 to 1,000 μm. This is because, average particle diameters smaller than the lower limit value lead to smaller spaces among powder particles such that gases present in the spaces scarcely leave therefrom and thus smaller gas bubbles are likely to be left there, while averaged particle sizes exceeding the upper limit value lead to excessively larger spaces among powder particles such that larger gas bubbles are likely to be left there. In the above, the average particle diameter $D_{50}$ is particularly preferably within a range of 80 to 600 μm. In the present specification, the average particle diameter $D_{50}$ means an average value of medians of particle distributions (diameter) measured three times by Laser Diffraction/Scattering Particle Size Distribution Analyzer (Model Name: HORIBA LA-950). The bulk density of the synthetic amorphous silica powder is preferably 1.00 g/cm³ or more. This is because, bulk densities smaller than the lower limit value lead to excessively larger spaces among powder particles such that larger gas bubbles are likely to be left there, while bulk densities exceeding the upper limit value lead to smaller spaces among powder particles such that gases present in the spaces scarcely leave therefrom and thus smaller gas bubbles are likely to be left there. In the above, the bulk density is particularly preferably within a range of 1.20 to 1.50 g/cm³.

To uniformalize meltabilities of powders, it is preferable that each powder has a broad diffraction peak and no crystalline silica powder particles are recognized therein when the powder is measured by a powder X-ray diffractometry using a Cu—Kα line. This is because, amorphous silica is different from crystalline silica in behavior of melting, in such a tendency that melting of the crystalline silica is belatedly started; so that gas bubbles are likely to be left in a synthetic silica glass product or the like when the synthetic silica glass product is manufactured by a synthetic amorphous silica powder containing amorphous and crystalline silicas in a mixed manner.

So as to decrease amounts of impurities in a synthetic silica glass product or so as to improve a performance of the product, the synthetic amorphous silica powder is to preferably have such an impurity concentration that concentrations are less than 1 ppm, respectively, for elements belonging to the 1A group, 2A to 8 groups, 1B to 3B groups except for a hydrogen atom, for elements belonging to the 4B group and 5B group except for carbon and silicon, for elements belonging to the 6B group except for oxygen, and for elements belonging to the 7B group except for chlorine. In the above, the impurity concentrations are particularly preferably less than 0.05 ppm, respectively. Further, to restrict generation or expansion of gas bubbles in a synthetic silica glass product at a high temperature and a reduced pressure, it is preferable that a hydroxyl group, chlorine, and carbon, which possibly act as gas components, respectively, are 60 ppm or less, 5 ppm or less, and 5 ppm or less, respectively, in concentration.

Particularly, in case of the synthetic amorphous silica powder according to the second embodiment of the present invention, firing is conducted before applying the spheroidizing treatment to the powder, so that gas components to be adsorbed to surfaces of powder particles and gas components inside the particles are extremely decreased in amount, thereby further enhancing an effect for reducing an amount of generation or degree of expansion of gas bubbles in a synthetic silica glass product. Namely, it is possible for the granulated silica powder to satisfy one or both of the conditions that it has a chlorine concentration less than 2 ppm and that it has a carbon concentration less than 2 ppm, by firing the silica powder under a predetermined condition.

When the granulated silica powder, i.e., the raw powder, is a silica powder obtained by: hydrolyzing silicon tetrachloride to produce a siliceous gel; drying the siliceous gel to turn it into a dry powder; pulverizing particles of the dry powder; and then classifying the pulverizedly obtained particles; the synthetic amorphous silica powder is made to have a carbon concentration less than 2 ppm by conducting firing thereof under a predetermined condition before the spheroidizing treatment. This is because, the silica powder is low in carbon concentration as compared to a silica powder obtained by using an organic silicon compound such as tetramethoxysilane, so that the synthetic amorphous silica powder obtained by using the former silica powder as a raw powder is relatively decreased in concentration of residual carbon.

Further, when the granulated silica powder is a silica powder obtained by: hydrolyzing an organic silicon compound to produce a siliceous gel; drying the siliceous gel to turn it into a dry powder; pulverizing particles of the dry powder; and then classifying the pulverizedly obtained particles; the synthetic amorphous silica powder is made to have a chlorine concentration less than 2 ppm by conducting firing thereof under a predetermined condition before the spheroidizing treatment. This is because, the silica powder is low in chlorine concentration as compared to a silica powder obtained by reacting a chlorine-based silicon compound in a liquid, so that the synthetic amorphous silica powder obtained by using the former silica powder as a raw powder is relatively decreased in concentration of residual chlorine.

Moreover, when the granulated silica powder is a silica powder obtained by: using a fumed silica to produce a siliceous gel; drying the siliceous gel to turn it into a dry powder; pulverizing particles of the dry powder; and then classifying the pulverizedly obtained particles; the synthetic amorphous silica powder is made to have a carbon concentration less than 2 ppm and a chlorine concentration less than 2 ppm by conducting firing thereof under a predetermined condition before the spheroidizing treatment. Namely, the synthetic amorphous silica powder obtained by using a silica powder obtained by reacting a raw powder with a chlorine-based silicon compound in a liquid, is likely to become relatively high in concentration of residual chlorine. Further, the synthetic amorphous silica powder obtained by using an organic silicon compound as a raw powder, is likely to become relatively high in concentration of residual carbon. In turn, the fumed silica is low in both of chlorine concentration and carbon concentration as compared to the above-described two types of silica powders, so that the synthetic amorphous silica powder obtained by using the fumed silica as a raw powder is extremely decreased in both of chlorine concentration and carbon concentration. This further enhances an effect for reducing an amount of generation or degree of expansion of gas bubbles in a synthetic silica glass product.

Figure 1:
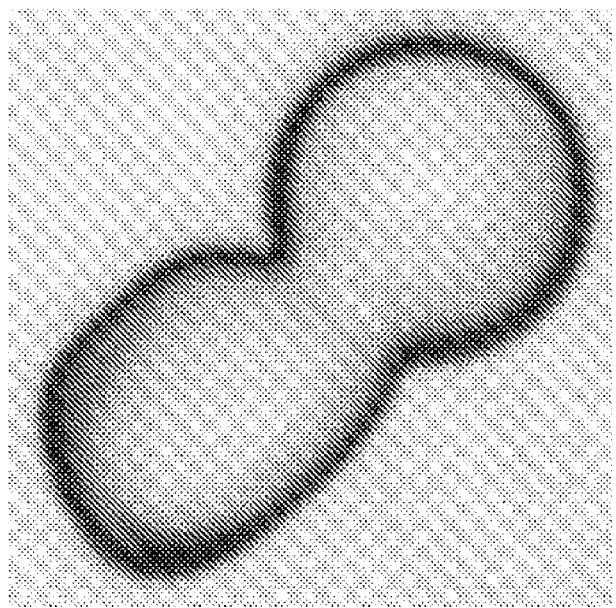
FIG. 1 is a photographic view of representative powder particles of a synthetic amorphous silica powder according to a first embodiment of the present invention.
Figure 2:
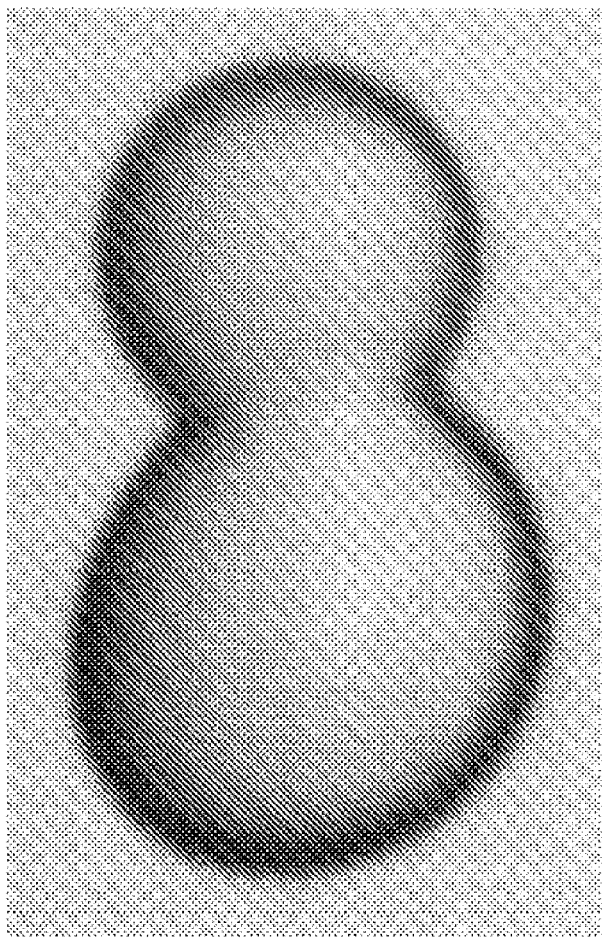
FIG. 2 is a photographic view of representative powder particles of a synthetic amorphous silica powder according to a second embodiment of the present invention.

The synthetic amorphous silica powder of the present invention contains numerous particles each comprising agglomerated multiple particles having been melted and spheroidized together as shown in FIG. 1 or FIG. 2, by cleaning and drying the powder after applying the spheroidizing treatment thereto. In this way, the circularity and spheroidization ratio of the synthetic amorphous silica powder exhibit the above ranges, respectively, because the powder contains numerous agglomerated particles such that the powder never contains numerous particles which are close to true spheres, respectively. Nonetheless, surfaces of particles of such a powder are smoothened by virtue of the melting, thereby decreasing inevitable gas adsorption amounts. It is noted in the present specification that those particles each comprising agglomerated multiple particles having been melted and spheroidized together, each constitute a single particle.

Figure 3:
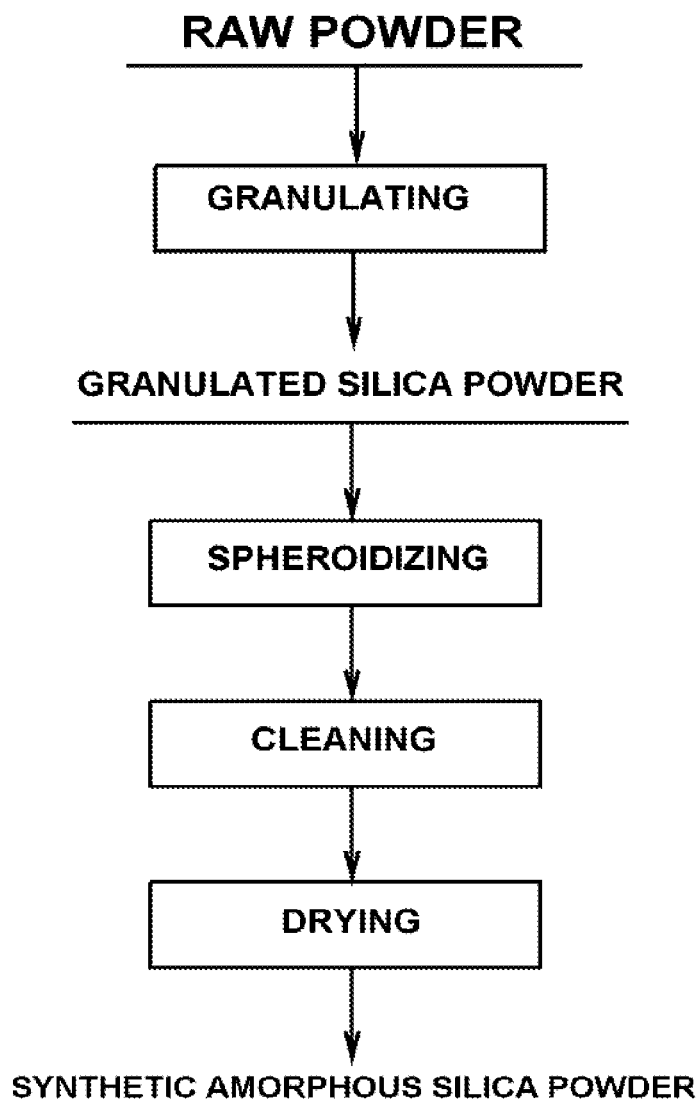
FIG. 3 is a process flow diagram showing a process for producing the synthetic amorphous silica powder according to the first embodiment of the present invention.
Figure 4:
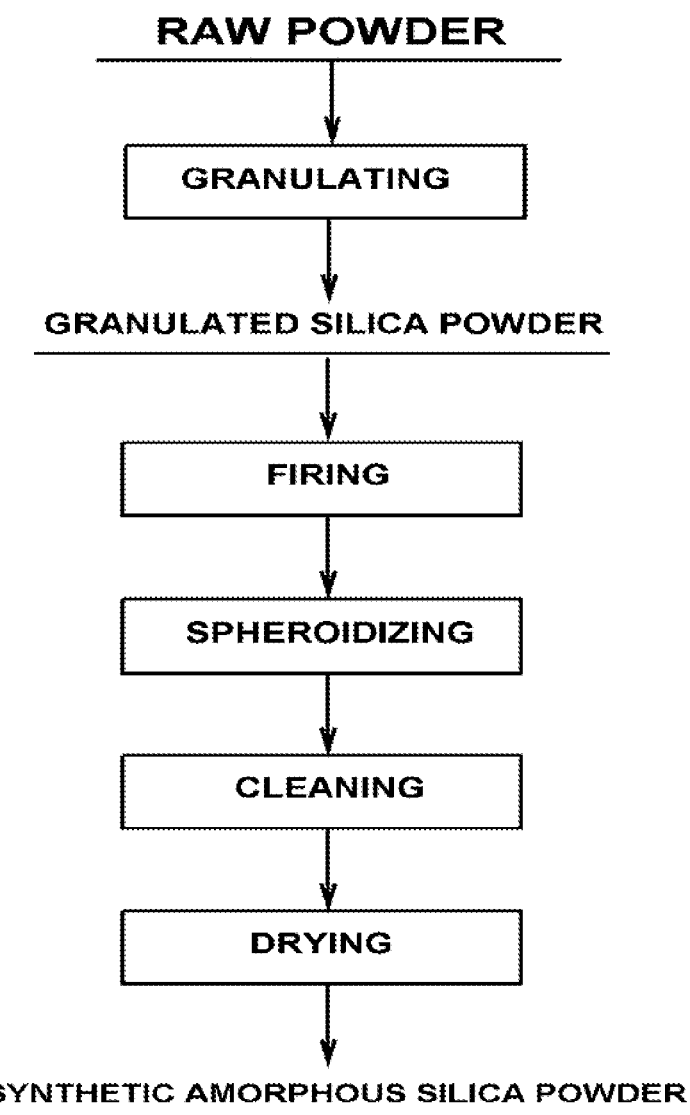
FIG. 4 is a process flow diagram showing a process for producing the synthetic amorphous silica powder according to the second embodiment of the present invention.

Next will be explained a method for producing the synthetic amorphous silica powder of the present invention. The method for producing a synthetic amorphous silica powder according to a first embodiment of the present invention is conducted as shown in FIG. 3, by applying a spheroidizing treatment to a silica powder to be used as a raw material, and by subsequently cleaning and drying it. Further, the method for producing a synthetic amorphous silica powder according to a second embodiment of the present invention is conducted as shown in FIG. 4, by firing a silica powder to be used as a raw material, applying a spheroidizing treatment to the fired silica powder, and subsequently cleaning and drying it. The respective steps will be explained in detail hereinafter.

The silica powder to be used as a raw material of the synthetic amorphous silica powder of the present invention is obtainable by the following techniques, for example. As a first technique, ultrapure water in an amount equivalent to 45 to 80 mols is firstly prepared per 1 mol of silicon tetrachloride. The prepared ultrapure water is charged into a vessel, and then the carbon tetrachloride is added thereinto, with stirring while keeping the temperature at 20 to 45° C. in an atmosphere of nitrogen, argon, or the like, thereby hydrolyzing the silicon tetrachloride. After addition of the silicon tetrachloride, stirring is continued for 0.5 to 6 hours, thereby producing a siliceous gel. At this time, it is preferable to set the stirring speed within a range of 100 to 300 rpm. Next, the siliceous gel is transferred into a container for drying which is brought into a drier, and the siliceous gel is dried for 12 to 48 hours at a temperature of 200° C. to 300° C. while flowing nitrogen, argon, or the like through within the drier preferably at a flow rate of 10 to 20 L/min, thereby obtaining a dry powder. This dry powder is then taken out of the drier, and pulverized by a crusher such as a roll crusher. In case of adopting a roll crusher, pulverizing is conducted by appropriately adjusting a roll gap to 0.2 to 2.0 mm and a roll revolution speed to 3 to 200 rpm. Finally, the pulverized particles of the dry powder are classified by using a vibrating screen or the like, thereby obtaining a silica powder having an average particle diameter $D_{50}$ of 10 to 3,000 µm, preferably 70 to 1,300 µm.

As a second technique, 0.5 to 3 mols of ultrapure water and 0.5 to 3 mols of ethanol are prepared per 1 mol of tetramethoxysilane as an organic silicon compound. The prepared ultrapure water and ethanol are charged into a vessel, and then the tetramethoxysilane is added thereinto, with stirring while keeping the temperature at 60° C. in an atmosphere of nitrogen, argon, or the like, thereby hydrolyzing the tetramethoxysilane. After addition of the tetramethoxysilane, stirring is continued for 5 to 120 minutes, and 1 to 50 mols of ultrapure water is further added thereinto per 1 mol of tetramethoxysilane, followed by continued stirring for 1 to 12 hours, thereby producing a siliceous gel. At this time, it is preferable to set the stirring speed within a range of 100 to 300 rpm. Next, the siliceous gel is transferred into a container for drying which is brought into a drier, and the siliceous gel is dried for 6 to 48 hours at a temperature of 200° C. to 300° C. while flowing nitrogen, argon, or the like through within the drier preferably at a flow rate of 10 to 20 L/min, thereby obtaining a dry powder. This dry powder is then taken out of the drier, and pulverized by a crusher such as a roll crusher. In case of adopting a roll crusher, pulverizing is conducted by appropriately adjusting a roll gap to 0.2 to 2.0 mm and a roll revolution speed to 3 to 200 rpm. Finally, the pulverized particles of the dry powder are classified by using a vibrating screen or the like, thereby obtaining a silica powder having an average particle diameter $D_{50}$ of 10 to 3,000 µm, preferably 70 to 1,300 µm.

As a third technique, 3.0 to 35.0 mols of ultrapure water is firstly prepared per 1 mol of fumed silica having an average particle diameter $D_{50}$ of 0.007 to 0.030 µm and a specific surface area of 50 to 380 m²/g. The prepared ultrapure water is charged into a vessel, and then the fumed silica is added thereinto, with stirring while keeping the temperature at 10 to 30° C. in an atmosphere of nitrogen, argon, or the like. After addition of the fumed silica, stirring is continued for 0.5 to 6 hours, thereby producing a siliceous gel. At this time, it is preferable to set the stirring speed within a range of 10 to 50 rpm. Next, the siliceous gel is transferred into a container for drying which is brought into a drier, and the siliceous gel is dried for 12 to 48 hours at a temperature of 200° C. to 300° C. while flowing nitrogen, argon, or the like through within the drier preferably at a flow rate of 1 to 20 L/min, thereby obtaining a dry powder. This dry powder is then taken out of the drier, and pulverized by a crusher such as a roll crusher. In case of adopting a roll crusher, pulverizing is conducted by appropriately adjusting a roll gap to 0.5 to 2.0 mm and a roll revolution speed to 3 to 200 rpm. Finally, the pulverized particles of the dry powder are classified by using a vibrating screen or the like, thereby obtaining a silica powder having an average particle diameter $D_{50}$ of 10 to 3,000 µm, preferably 70 to 1,300 µm.

While the thus obtained silica powder by granulation in the above manner is to be subjected to a spheroidizing treatment under a condition to be described later, firing is to be conducted under a predetermined condition as shown in FIG. 4 before the spheroidizing treatment in case of a method for producing a synthetic amorphous silica powder according to a second embodiment of the present invention. This firing is conducted in a vessel made of heat-resistant glass, quartz, or the like, at a temperature of 800 to 1,450° C. in an atmospheric air or in a nitrogen atmosphere. By providing a firing step before a spheroidizing treatment step, it becomes possible to remarkably decrease amounts of gas components to be otherwise adsorbed on surfaces of powder particles and gas components to be otherwise present within the powder particles. Further, since particles of the firstly obtained powder granulated from fumed silica have nano-sized closed pores therein, voids are left within the particles when the powder is subjected to the spheroidizing treatment. Thus, it is possible to eliminate the nano-sized closed pores, by firing the powder granulated from fumed silica, before the spheroidizing treatment. Firing temperatures lower than the lower limit temperature fail to sufficiently obtain such effects by virtue of firing, for decreasing amounts of gas components, and for eliminating closed pores in the fumed silica. In turn, firing temperatures exceeding the upper limit temperature lead to occurrence of such a problem that powder particles are bound to one another.

The spheroidization of the silica powder obtained by any one of the first to third techniques, or the spheroidization of the silica powder obtained by firing the above obtained silica powder under the above condition, is attained by a spheroidizing treatment based on thermal plasma. In the spheroidizing treatment based on thermal plasma, it is possible to use an apparatus shown in FIG. 5, for example. This apparatus 30 comprises a plasma torch 31 for generating plasma, a chamber 32 as a reaction tube provided at a lower portion of the plasma torch 31, and a collecting portion 33 provided at a lower portion of the chamber 32 so as to collect a powder after treatment. The plasma torch 31 has: a quartz tube 34 communicated with the chamber 32 and sealed at a top portion; and a high-frequency inductive coil 36 wound around the quartz tube 34. The quartz tube 34 has an upper portion, which is provided with a raw material supplying tube 37 therethrough, and connected with a gas introducing tube 38. The chamber 32 is provided at its lateral side with a gas exhaust port 39. In the plasma torch 31, energization of the high-frequency inductive coil 36 generates a plasma 40, and the quartz tube 34 is supplied with a gas such as argon, oxygen, or the like from the gas introducing tube 38. Further, supplied into the plasma 40 is a raw powder through the raw material supplying tube 37. The gas within the chamber 32 is exhausted from the gas exhaust port 39 provided at the lateral side of the chamber 32. Firstly, argon as a working gas is introduced from the gas introducing tube 38 of the apparatus 30 at a flow rate of 15 to 40 L/min, while applying a high frequency wave at a frequency of 3 to 5 MHz and at a power of 30 to 80 kW to the plasma torch 31, thereby generating a plasma. After the plasma is stabilized, oxygen is gradually introduced at a flow rate of 35 to 110 L/min, thereby causing generation of an argon-oxygen plasma. Then, the silica powder obtained by any one of the first to third techniques is delivered from the raw material supplying tube 37 into the argon-oxygen plasma at a supplying rate of 3.0 to 20.5 kg/hr to thereby melt the silica powder, such that particles now made into melted bodies are caused to fall and collected by the collecting portion 33, thereby enabling to obtain spheroidized silica powder particles 41. Adjustments of a circularity, a spheroidization ratio, and the like of the synthetic amorphous silica powder can be conducted by adjusting the high-frequency power, the supplying rate of the raw silica powder, and the like. For example, when the high-frequency power (W) is represented by A and the supplying rate (kg/hr) of the silica powder is represented by B within the above ranges, respectively, it is possible to obtain desired circularity and spheroidization ratio by adjusting the high-frequency power A and the supplying rate B such that the value of A/B (W·hr/kg) is in a range between $3.0 \times 10^3$ inclusive and $1.0 \times 10^4$ exclusive.

Because silica powder particles after the spheroidizing treatment have surfaces carrying those fine particles attached thereto which have once evaporated into the argon-oxygen plasma, ultrasonic cleaning is conducted such that the spheroidized silica powder particles after the spheroidizing step and ultrapure water are put into a cleaning vessel. Since the fine particles are migrated into the ultrapure water after the ultrasonic cleaning, filtration is conducted by a filter having a coarse mesh. This operation is conducted repetitively until fine particles of the silica powder are fully filtered out.

For drying the silica powder after the cleaning step, the powder is firstly put into a container for drying, and then the container for drying is brought into a drier. Then, drying is preferably conducted by flowing nitrogen, argon, or the like at a flow rate of 1 to 20 L/min through within the drier, and by holding the powder at a temperature of 100° C. to 400° C. for 3 to 48 hours.

By the above steps, the synthetic amorphous silica powder of the present invention is obtained. This synthetic amorphous silica powder is less in inevitable gas adsorption amount, so that the powder is preferably usable as a raw material of a synthetic silica glass product. Particularly, according to the production method according to the second embodiment of the present invention, the firing step under the predetermined condition is provided before the spheroidizing treatment step, thereby enabling to remarkably decrease amounts of gas components to be otherwise adsorbed on surfaces of powder particles and gas components to be otherwise present within the powder particles.

EXAMPLES

Next, Examples of the present invention will be explained in detail, together with Comparative Examples.

Example 1

Firstly, ultrapure water was prepared in an amount equivalent to 55.6 mols, per 1 mol of silicon tetrachloride. This ultrapure water was brought into a vessel, and then the carbon tetrachloride was added thereinto, with stirring while keeping the temperature at 25° C. in an atmosphere of nitrogen, thereby hydrolyzing the silicon tetrachloride. After addition of the silicon tetrachloride, stirring was continued for 3 hours, thereby producing a siliceous gel. At this time, the stirring speed was set to be 150 rpm. Next, the siliceous gel was transferred into a container for drying which was brought into a drier, and the siliceous gel was dried for 18 hours at a temperature of 250° C. while flowing nitrogen through within the drier at a flow rate of 15 L/min, thereby obtaining a dry powder. This dry powder was then taken out of the drier, and pulverized by a roll crusher. At this time, pulverizing was conducted by adjusting a roll gap to 0.2 mm and a roll revolution speed to 50 rpm. The pulverized particles of the dry powder were classified by using a vibrating screen having openings of 100 µm and a vibrating screen having openings of 150 µm, thereby obtaining a silica powder having an average particle diameter $D_{50}$ of 121 µm.

Figure 5:
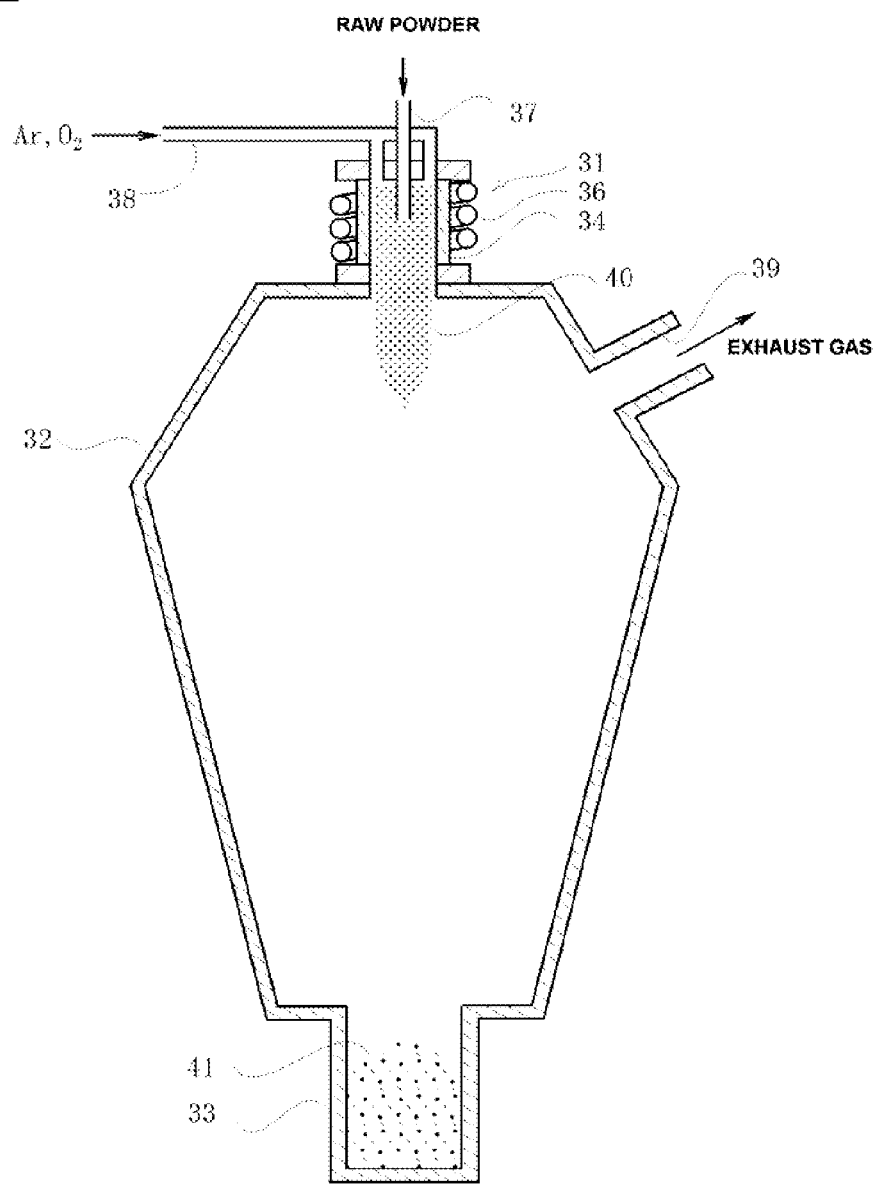
FIG. 5 is a schematic cross-sectional view of a spheroidizing apparatus based on thermal plasma.

Subsequently, the apparatus 30 shown in FIG. 5 was used to apply a spheroidizing treatment to the above obtained silica powder under an applicable condition shown in Table 1 described below, without conducting firing of the silica powder. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultrapure water were put into a cleaning vessel, to conduct ultrasonic cleaning. After conducting the ultrasonic cleaning, filtration was conducted by a filter having openings of 50 µm. This operation was conducted repetitively until fine particles attached to surfaces of the silica powder particles were fully filtered out.

Finally, the cleaned powder was charged into a container for drying, which was then brought into a drier, and drying was conducted by flowing nitrogen at a flow rate of 10 L/min through within the drier, and by holding the powder at a temperature of 200° C. for 48 hours, thereby obtaining a synthetic amorphous silica powder.

Example 2

Firstly, 1 mol of ultrapure water and 1 mol of ethanol were prepared per 1 mol of tetramethoxysilane. The prepared ultrapure water and ethanol were charged into a vessel, and then the tetramethoxysilane was added thereinto, with stirring while keeping the temperature at 60° C. in an atmosphere of nitrogen, thereby hydrolyzing the tetramethoxysilane. After addition of the tetramethoxysilane, stirring was continued for 60 minutes, and 25 mols of ultrapure water was further added thereinto per 1 mol of tetramethoxysilane, followed by continued stirring for 6 hours, thereby producing a siliceous gel. At this time, the stirring speed was set to be 100 rpm. Next, the siliceous gel was transferred into a container for drying which was brought into a drier, and the siliceous gel was dried for 24 hours at a temperature of 200° C. while flowing nitrogen through within the drier at a flow rate of 20 L/min, thereby obtaining a dry powder. This dry powder was then taken out of the drier, and pulverized by a roll crusher. At this time, pulverizing was conducted by adjusting a roll gap to 0.2 mm and a roll revolution speed to 55 rpm. The pulverized particles of the dry powder were classified by using a vibrating screen having openings of 100 µm and a vibrating screen having openings of 150 µm, thereby obtaining a silica powder having an average particle diameter $D_{50}$ of 130 µm.

Subsequently, the apparatus 30 shown in FIG. 5 was used to apply a spheroidizing treatment to the above obtained silica powder under an applicable condition shown in Table 1 described below, without conducting firing of the silica powder. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultrapure water were put into a cleaning vessel, to conduct ultrasonic cleaning. After conducting the ultrasonic cleaning, filtration was conducted by a filter having openings of 50 µm. This operation was conducted repetitively until fine particles attached to surfaces of the silica powder particles were fully filtered out.

Finally, the powder after cleaning was charged into a container for drying, which was then brought into a drier, and drying was conducted by flowing argon at a flow rate of 10 L/min through within the drier, and by holding the powder at a temperature of 300° C. for 12 hours, thereby obtaining a synthetic amorphous silica powder.

Example 3

Firstly, 13 mols of ultrapure water was prepared per 1 mol of fumed silica having an average particle diameter $D_{50}$ of 0.020 µm and a specific surface area of 90 m²/g. The prepared ultrapure water was charged into a vessel, and then the fumed silica was added thereinto, with stirring while keeping the temperature at 25° C. in an atmosphere of nitrogen. After addition of the fumed silica, stirring was continued for 3 hours, thereby producing a siliceous gel. At this time, the stirring speed was set to be 30 rpm. Next, the siliceous gel was transferred into a container for drying which was brought into a drier, and the siliceous gel was dried for 12 hours at a temperature of 300° C. while flowing nitrogen through within the drier at a flow rate of 10 L/min, thereby obtaining a dry powder. This dry powder was then taken out of the drier, and pulverized by a roll crusher. At this time, pulverizing was conducted by adjusting a roll gap to 0.5 mm and a roll revolution speed to 30 rpm. The pulverized particles of the dry powder were classified by using a vibrating screen having openings of 375 µm and a vibrating screen having openings of 450 µm, thereby obtaining a silica powder having an average particle diameter $D_{50}$ of 426 µm.

Subsequently, the apparatus 30 shown in FIG. 5 was used to apply a spheroidizing treatment to the above obtained silica powder under an applicable condition shown in Table 1 described below, without conducting firing of the silica powder. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultrapure water were put into a cleaning vessel, to conduct ultrasonic cleaning. After conducting the ultrasonic cleaning, filtration was conducted by a filter having openings of 200 µm. This operation was conducted repetitively until fine particles attached to surfaces of the silica powder particles were fully filtered out.

Finally, the powder after cleaning was charged into a container for drying, which was then brought into a drier, and drying was conducted by flowing nitrogen at a flow rate of 20 L/min through within the drier, and by holding the powder at a temperature of 200° C. for 36 hours, thereby obtaining a synthetic amorphous silica powder.

Example 4

Conducted was the same procedure as Example 1 to obtain a synthetic amorphous silica powder, except that the spheroidizing treatment was applied to this silica powder under an applicable condition shown in Table 1 described below, and the obtained silica powder had an average particle diameter $D_{50}$ of 860 µm.

Comparative Example 1

Conducted was the same procedure as Example 1 to obtain a synthetic amorphous silica powder, except that the spheroidizing treatment was applied under an applicable condition shown in Table 1 described below.

Comparative Example 2

Conducted was the same procedure as Example 1 to obtain a synthetic amorphous silica powder, except that the spheroidizing treatment was applied under an applicable condition shown in Table 1 described below.

Comparative Example 3

Conducted was the same procedure as Example 2 to obtain a synthetic amorphous silica powder, except that the spheroidizing treatment was applied under an applicable condition shown in Table 1 described below.

Comparative Example 4

Conducted was the same procedure as Example 3 to obtain a synthetic amorphous silica powder, except that the spheroidizing treatment was applied under an applicable condition shown in Table 1 described below.

Comparative Example 5

Conducted was the same procedure as Example 3 to obtain a synthetic amorphous silica powder, except that the spheroidizing treatment was applied under an applicable condition shown in Table 1 described below.

Comparative Example 6

Conducted was the same procedure as Example 3 to obtain a synthetic amorphous silica powder, except that the spheroidizing treatment was applied under an applicable condition shown in Table 1 described below.

Comparative Example 7

Conducted was the same procedure as Example 4 to obtain a synthetic amorphous silica powder, except that the spheroidizing treatment was applied under an applicable condition shown in Table 1 described below.

Comparative Example 8

Conducted was the same procedure as Example 4 to obtain a synthetic amorphous silica powder, except that the spheroidizing treatment was applied under an applicable condition shown in Table 1 described below.

Comparative Example 9

Firstly, ultrapure water was prepared in an amount equivalent to 55.6 mols, per 1 mol of silicon tetrachloride. This ultrapure water was brought into a vessel, and then the carbon tetrachloride was added thereinto, with stirring while keeping the temperature at 25° C. in an atmosphere of nitrogen, thereby hydrolyzing the silicon tetrachloride. After addition of the silicon tetrachloride, stirring was continued for 3 hours, thereby producing a siliceous gel. At this time, the stirring speed was set to be 150 rpm. Next, the siliceous gel was transferred into a container for drying which was brought into a drier, and the siliceous gel was dried for 18 hours at a temperature of 250° C. while flowing nitrogen through within the drier at a flow rate of 15 L/min, thereby obtaining a dry powder. This dry powder was then taken out of the drier, and pulverized by a roll crusher. At this time, pulverizing was conducted by adjusting a roll gap to 0.2 mm and a roll revolution speed to 50 rpm. The pulverized particles of the dry powder were classified by using a vibrating screen having openings of 50 μm and a vibrating screen having openings of 150 μm, thereby obtaining a silica powder having an average particle diameter $D_{50}$ of 100 μm.

Finally, the pulverized powder was charged into a vessel for firing, then the vessel for firing was brought into a firing furnace, and firing was conducted by flowing nitrogen at a flow rate of 10 L/min through within the firing furnace, and by holding the powder at a temperature of 1,200° C. for 48 hours, thereby obtaining a synthetic amorphous silica powder. This silica powder without applying a spheroidizing treatment thereto, was made to be Comparative Example 9.

Comparative Example 10

Firstly, 1 mol of ultrapure water and 1 mol of ethanol were prepared per 1 mol of tetramethoxysilane. The prepared ultrapure water and ethanol were charged into a vessel, and then the tetramethoxysilane was added thereinto, with stirring while keeping the temperature at 60° C. in an atmosphere of nitrogen, thereby hydrolyzing the tetramethoxysilane. After addition of the tetramethoxysilane, stirring was continued for 60 minutes, and 25 mols of ultrapure water was further added thereinto per 1 mol of tetramethoxysilane, followed by continued stirring for 6 hours, thereby producing a siliceous gel. At this time, the stirring speed was set to be 100 rpm. Next, the siliceous gel was transferred into a container for drying which was brought into a drier, and the siliceous gel was dried for 24 hours at a temperature of 200° C. while flowing nitrogen through within the drier at a flow rate of 20 L/min, thereby obtaining a dry powder. This dry powder was then taken out of the drier, and pulverized by a roll crusher. At this time, pulverizing was conducted by adjusting a roll gap to 0.6 mm and a roll revolution speed to 100 rpm. The pulverized particles of the dry powder were classified by using a vibrating screen having openings of 550 μm and a vibrating screen having openings of 650 μm, thereby obtaining a silica powder having an average particle diameter $D_{50}$ of 590 μm.

Finally, the pulverized powder was charged into a vessel for firing, then the vessel for firing was brought into a firing furnace, and firing was conducted by flowing argon at a flow rate of 10 L/min through within the firing furnace, and by holding the powder at a temperature of 1,200° C. for 48 hours, thereby obtaining a synthetic amorphous silica powder. This silica powder without applying a spheroidizing treatment thereto, was made to be Comparative Example 10.

Comparative Example 11

Firstly, 13 mols of ultrapure water was prepared per 1 mol of fumed silica having an average particle diameter $D_{50}$ of 0.020 μm and a specific surface area of 90 m$^2$/g. The prepared ultrapure water was charged into a vessel, and then the fumed silica was added thereinto, with stirring while keeping the temperature at 25° C. in an atmosphere of nitrogen. After addition of the fumed silica, stirring was continued for 3 hours, thereby producing a siliceous gel. At this time, the stirring speed was set to be 30 rpm. Next, the siliceous gel was transferred into a container for drying which was brought into a drier, and the siliceous gel was dried for 12 hours at a temperature of 300° C. while flowing nitrogen through within the drier at a flow rate of 10 L/min, thereby obtaining a dry powder. This dry powder was then taken out of the drier, and pulverized by a roll crusher. At this time, pulverizing was conducted by adjusting a roll gap to 0.9 mm and a roll revolution speed to 150 rpm. The pulverized particles of the dry powder were classified by using a vibrating screen having openings of 850 μm and a vibrating screen having openings of 950 μm, thereby obtaining a silica powder having an average particle diameter $D_{50}$ of 895 μm.

Finally, the pulverized powder was charged into a vessel for firing, then the vessel for firing was brought into a firing furnace, and firing was conducted by flowing argon at a flow rate of 10 L/min through within the firing furnace, and by holding the powder at a temperature of 1,200° C. for 48 hours, thereby obtaining a synthetic amorphous silica powder. This silica powder without applying a spheroidizing treatment thereto, was made to be Comparative Example 11.

TABLE 1

| | Silica powder | | | Spheroidizing treatment condition | | | | | |
|---|---|---|---|---|---|---|---|---|---|
| | | Average particle diameter D50 [μm] | | Frequency of high- | High- frequency | Ar gas | Oxygen | Raw powder | |
| | Raw material | Before firing | After firing | frequency wave [MHz] | power A [kW] | flow rate [L/min] | flow rate [L/min] | supplying rate B [kg/hr] | A/B [W · hr/kg] |
| Example 1 | Silicon tetrachloride | 121 | — | 3 | 30 | 15 | 35 | 3.2 | $9.4 \times 10^3$ |
| Example 2 | Tetramethoxysilane | 130 | — | 4 | 50 | 20 | 75 | 7.1 | $7.0 \times 10^3$ |
| Example 3 | Fumed silica | 426 | — | 5 | 70 | 25 | 70 | 12.5 | $5.6 \times 10^3$ |
| Example 4 | Silicon tetrachloride | 860 | — | 5 | 80 | 40 | 110 | 26.9 | $3.0 \times 10^3$ |
| Comparative Example 1 | Silicon tetrachloride | 121 | — | 5 | 120 | 60 | 120 | 10.4 | $1.2 \times 10^4$ |
| Comparative Example 2 | Silicon tetrachloride | 121 | — | 5 | 120 | 60 | 140 | 41.6 | $2.9 \times 10^3$ |
| Comparative Example 3 | Tetramethoxysilane | 130 | — | 5 | 90 | 30 | 60 | 35.7 | $2.5 \times 10^3$ |
| Comparative Example 4 | Fumed silica | 426 | — | 4 | 60 | 20 | 75 | 20.8 | $2.9 \times 10^3$ |
| Comparative Example 5 | Fumed silica | 426 | — | 4 | 30 | 20 | 30 | 1.2 | $2.5 \times 10^3$ |

TABLE 1-continued

| | Silica powder | | | Spheroidizing treatment condition | | | | | |
|---|---|---|---|---|---|---|---|---|---|
| | | Average particle diameter D50 [μm] | | Frequency of high- | High-frequency | Ar gas | Oxygen | Raw powder | |
| | Raw material | Before firing | After firing | frequency wave [MHz] | power A [kW] | flow rate [L/min] | flow rate [L/min] | supplying rate B [kg/hr] | A/B [W · hr/kg] |
| Comparative Example 6 | Fumed silica | 426 | — | 4 | 30 | 10 | 40 | 10.4 | $2.9 \times 10^3$ |
| Comparative Example 7 | Silicon tetrachloride | 860 | — | 2 | 30 | 20 | 20 | 2.1 | $1.4 \times 10^4$ |
| Comparative Example 8 | Silicon tetrachloride | 860 | — | 2 | 30 | 15 | 55 | 10.7 | $2.8 \times 10^3$ |
| Comparative Example 9 | Silicon tetrachloride | 100 | — | — | — | — | — | — | — |
| Comparative Example 10 | Tetramethoxysilane | 590 | — | — | — | — | — | — | — |
| Comparative Example 11 | Fumed silica | 895 | — | — | — | — | — | — | — |

Example 5

Firstly, 12 mols of ultrapure water was prepared per 1 mol of fumed silica having an average particle diameter $D_{50}$ of 0.020 μm and a specific surface area of 90 m²/g. The prepared ultrapure water was charged into a vessel, and then the fumed silica was added thereinto, with stirring while keeping the temperature at 30° C. in an atmosphere of argon. After addition of the fumed silica, stirring was continued for 2 hours, thereby producing a siliceous gel. At this time, the stirring speed was set to be 20 rpm. Next, the siliceous gel was transferred into a container for drying which was brought into a drier, and the siliceous gel was dried for 15 hours at a temperature of 250° C. while flowing argon through within the drier at a flow rate of 10 L/min, thereby obtaining a dry powder. This dry powder was then taken out of the drier, and pulverized by a roll crusher. At this time, pulverizing was conducted by adjusting a roll gap to 0.2 mm and a roll revolution speed to 25 rpm. The pulverized particles of the dry powder were classified by using a vibrating screen having openings of 75 μm and a vibrating screen having openings of 200 μm, thereby obtaining a silica powder having an average particle diameter $D_{50}$ of 141 μm.

The granulated powder was put into a quartz vessel and subjected to firing in the atmospheric air at 1,200° C. for 36 hours, thereby obtaining a silica powder having an average particle diameter $D_{50}$ of 98 μm.

Subsequently, the apparatus 30 shown in FIG. 5 was used to apply a spheroidizing treatment, under an applicable condition shown in Table 2 described below, to the silica powder obtained after firing. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultrapure water were put into a cleaning vessel, to conduct ultrasonic cleaning. After conducting the ultrasonic cleaning, filtration was conducted by a filter having openings of 54 μm. This operation was conducted repetitively until fine particles attached to surfaces of the silica powder particles were fully filtered out.

Finally, the powder after cleaning was charged into a container for drying, then the container for drying was brought into a drier, and drying was conducted by flowing argon at a flow rate of 10 L/min through within the drier, and by holding the powder at a temperature of 250° C. for 48 hours, thereby obtaining a synthetic amorphous silica powder.

Example 6

Firstly, 5 mols of ultrapure water was prepared per 1 mol of fumed silica having an average particle diameter $D_{50}$ of 0.030 μm and a specific surface area of 50 m²/g. The prepared ultrapure water was charged into a vessel, and then the fumed silica was added thereinto, with stirring while keeping the temperature at 20° C. in an atmosphere of nitrogen. After addition of the fumed silica, stirring was continued for 0.5 hour, thereby producing a siliceous gel. At this time, the stirring speed was set to be 30 rpm. Next, the siliceous gel was transferred into a container for drying which was brought into a drier, and the siliceous gel was dried for 48 hours at a temperature of 200° C. while flowing nitrogen through within the drier at a flow rate of 15 L/min, thereby obtaining a dry powder. This dry powder was then taken out of the drier, and pulverized by a roll crusher. At this time, pulverizing was conducted by adjusting a roll gap to 0.3 mm and a roll revolution speed to 100 rpm. The pulverized particles of the dry powder were classified by using a vibrating screen having openings of 75 μm and a vibrating screen having openings of 250 μm, thereby obtaining a silica powder having an average particle diameter $D_{50}$ of 156 μm.

The granulated powder was put into a quartz vessel and subjected to firing in the atmospheric air at 1,250° C. for 24 hours, thereby obtaining a silica powder having an average particle diameter $D_{50}$ of 106 μm.

Subsequently, the apparatus 30 shown in FIG. 5 was used to apply a spheroidizing treatment, under an applicable condition shown in Table 2 described below, to the silica powder obtained after firing. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultrapure water were put into a cleaning vessel, to conduct ultrasonic cleaning. After conducting the ultrasonic cleaning, filtration was conducted by a filter having openings of 50 μm. This operation was conducted repetitively until fine particles attached to surfaces of the silica powder particles were fully filtered out.

Finally, the powder after cleaning was charged into a container for drying, then the container for drying was brought into a drier, and drying was conducted by flowing nitrogen at a flow rate of 1 L/min through within the drier, and by holding the powder at a temperature of 400° C. for 12 hours, thereby obtaining a synthetic amorphous silica powder.

Example 7

Firstly, 30 mols of ultrapure water was prepared per 1 mol of fumed silica having an average particle diameter $D_{50}$ of 0.007 μm and a specific surface area of 300 m$^2$/g. The prepared ultrapure water was charged into a vessel, and then the fumed silica was added thereinto, with stirring while keeping the temperature at 10° C. in an atmosphere of argon. After addition of the fumed silica, stirring was continued for 6 hours, thereby producing a siliceous gel. At this time, the stirring speed was set to be 50 rpm. Next, the siliceous gel was transferred into a container for drying which was brought into a drier, and the siliceous gel was dried for 12 hours at a temperature of 300° C. While flowing nitrogen through within the drier at a flow rate of 15 L/min, thereby obtaining a dry powder. This dry powder was then taken out of the drier, and pulverized by a roll crusher. At this time, pulverizing was conducted by adjusting a roll gap to 0.5 mm and a roll revolution speed to 100 rpm. The pulverized particles of the dry powder were classified by using a vibrating screen having openings of 300 μm and a vibrating screen having openings of 700 μm, thereby obtaining a silica powder having an average particle diameter $D_{50}$ of 502 μm.

The granulated powder was put into a quartz vessel and subjected to firing in the atmospheric air at 1,300° C. for 72 hours, thereby obtaining a silica powder having an average particle diameter $D_{50}$ of 350 μm.

Subsequently, the apparatus 30 shown in FIG. 5 was used to apply a spheroidizing treatment, under an applicable condition shown in Table 2 described below, to the silica powder obtained after firing. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultrapure water were put into a cleaning vessel, to conduct ultrasonic cleaning. After conducting the ultrasonic cleaning, filtration was conducted by a filter having openings of 200 μm. This operation was conducted repetitively until fine particles attached to surfaces of the silica powder particles were fully filtered out.

Finally, the powder after cleaning was charged into a container for drying, then the container for drying was brought into a drier, and drying was conducted by flowing nitrogen at a flow rate of 10 L/min through within the drier, and by holding the powder at a temperature of 250° C. for 24 hours, thereby obtaining a synthetic amorphous silica powder.

Example 8

Firstly, 15 mols of ultrapure water was prepared per 1 mol of fumed silica having an average particle diameter $D_{50}$ of 0.016 μm and a specific surface area of 130 m$^2$/g. The prepared ultrapure water was charged into a vessel, and then the fumed silica was added thereinto, with stirring while keeping the temperature at 25° C. in an atmosphere of argon. After addition of the fumed silica, stirring was continued for 3 hours, thereby producing a siliceous gel. At this time, the stirring speed was set to be 15 rpm. Next, the siliceous gel was transferred into a container for drying which was brought, into a drier, and the siliceous gel was dried for 36 hours at a temperature of 200° C. while flowing argon through within the drier at a flow rate of 10 L/min, thereby obtaining a dry powder. This dry powder was then taken out of the drier, and pulverized by a roll crusher. At this time, pulverizing was conducted by adjusting a roll gap to 1.0 mm and a roll revolution speed to 50 rpm. The pulverized particles of the dry powder were classified by using a vibrating screen having openings of 500 μm and a vibrating screen having openings of 1,500 μm, thereby obtaining a silica powder having an average particle diameter $D_{50}$ of 987 μm.

The granulated powder was put into a quartz vessel and subjected to firing in the atmospheric air at 1,450° C. for 72 hours, thereby obtaining a silica powder having an average particle diameter $D_{50}$ of 691 μm.

Subsequently, the apparatus 30 shown in FIG. 5 was used to apply a spheroidizing treatment, under an applicable condition shown in Table 2 described below, to the silica powder obtained after firing. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultrapure water were put into a cleaning vessel, to conduct ultrasonic cleaning. After conducting the ultrasonic cleaning, filtration was conducted by a filter having openings of 400 μm. This operation was conducted repetitively until fine particles attached to surfaces of the silica powder particles were fully filtered out.

Finally, the powder after cleaning was charged into a container for drying, then the container for drying was brought into a drier, and drying was conducted by flowing nitrogen at a flow rate of 10 L/min through within the drier, and by holding the powder at a temperature of 300° C. for 24 hours, thereby obtaining a synthetic amorphous silica powder.

Example 9

Firstly, ultrapure water was prepared in an amount equivalent to 60 mols, per 1 mol of silicon tetrachloride. This ultrapure water was brought into a vessel, and then the silicon tetrachloride was added thereinto, with stirring while keeping the temperature at 30° C. in an atmosphere of nitrogen, thereby hydrolyzing the silicon tetrachloride. After addition of the silicon tetrachloride, stirring was continued for 4 hours, thereby producing a siliceous gel. At this time, the stirring speed was set to be 250 rpm. Next, the siliceous gel was transferred into a container for drying which was brought into a drier, and the siliceous gel was dried for 24 hours at a temperature of 250° C. while flowing nitrogen through within the drier at a flow rate of 10 L/min, thereby obtaining a dry powder. This dry powder was then taken out of the drier, and pulverized by a roll crusher. At this time, pulverizing was conducted by adjusting a roll gap to 0.2 mm and a roll revolution speed to 150 rpm. The pulverized particles of the dry powder were classified by using a vibrating screen having openings of 50 μm and a vibrating screen having openings of 250 μm, thereby obtaining a silica powder having an average particle diameter $D_{50}$ of 148 μm.

The granulated powder was put into a quartz vessel and subjected to firing in the atmospheric air at 1,350° C. for 24 hours, thereby obtaining a silica powder having an average particle diameter $D_{50}$ of 111 μm.

Subsequently, the apparatus 30 shown in FIG. 5 was used to apply a spheroidizing treatment, under an applicable condition shown in Table 2 described below, to the silica powder obtained after firing. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultra-pure water were put into a cleaning vessel, to conduct ultrasonic cleaning. After conducting the ultrasonic cleaning, filtration was conducted by a filter having openings of 50 μm. This operation was conducted repetitively until fine particles attached to surfaces of the silica powder particles were fully filtered out.

Finally, the powder after cleaning was charged into a container for drying, which was then brought into a drier, and drying was conducted by flowing nitrogen at a flow rate of 15 L/min through within the drier, and by holding the powder at a temperature of 150° C. for 48 hours, thereby obtaining a synthetic amorphous silica powder.

Example 10

Firstly, 1 mol of ultrapure water and 1 mol of ethanol were prepared per 1 mol of tetramethoxysilane. The prepared ultra-pure water and ethanol were charged into a vessel, and then the tetramethoxysilane was added thereinto, with stirring while keeping the temperature at 60° C. in an atmosphere of nitrogen, thereby hydrolyzing the tetramethoxysilane. After addition of the tetramethoxysilane, stirring was continued for 60 minutes, and 25 mols of ultrapure water was further added thereinto per 1 mol of tetramethoxysilane, followed by continued stirring for 6 hours, thereby producing a siliceous gel. At this time, the stirring speed was set to be 100 rpm. Next, the siliceous gel was transferred into a container for drying which was brought into a drier, and the siliceous gel was dried for 24 hours at a temperature of 200° C. while flowing nitrogen through within the drier at a flow rate of 20 L/min, thereby obtaining a dry powder. This dry powder was then taken out of the drier, and pulverized by a roll crusher. At this time, pulverizing was conducted by adjusting a roll gap to 0.2 mm and a roll revolution speed to 55 rpm. The pulverized particles of the dry powder were classified by using a vibrating screen having openings of 75 μm and a vibrating screen having openings of 250 μm, thereby obtaining a silica powder having an average particle diameter $D_{50}$ of 163 μm.

The granulated powder was put into a quartz vessel and subjected to firing in the atmospheric air at 1,150° C. for 72 hours, thereby obtaining a silica powder having an average particle diameter $D_{50}$ of 115 μm.

Subsequently, the apparatus 30 shown in FIG. 5 was used to apply a spheroidizing treatment, under an applicable condition shown in Table 2 described below, to the silica powder obtained after firing. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultra-pure water were put into a cleaning vessel, to conduct ultrasonic cleaning. After conducting the ultrasonic cleaning, filtration was conducted by a filter having openings of 50 μm. This operation was conducted repetitively until fine particles attached to surfaces of the silica powder particles were fully filtered out.

Finally, the powder after cleaning was charged into a container for drying, which was then brought into a drier, and drying was conducted by flowing argon at a flow rate of 10 L/min through within the drier, and by holding the powder at a temperature of 300° C. for 12 hours, thereby obtaining a synthetic amorphous silica powder.

Comparative Example 12

Firstly, 12 mols of ultrapure water was prepared per 1 mol of fumed silica having an average particle diameter $D_{50}$ of 0.020 μm and a specific surface area of 90 m$^2$/g. The prepared ultrapure water was charged into a vessel, and then the fumed silica was added thereinto, with stirring while keeping the temperature at 30° C. in an atmosphere of nitrogen. After addition of the fumed silica, stirring was continued for 2 hours, thereby producing a siliceous gel. At this time, the stirring speed was set to be 20 rpm. Next, the siliceous gel was transferred into a container for drying which was brought into a drier, and the siliceous gel was dried for 15 hours at a temperature of 250° C. while flowing argon through within the drier at a flow rate of 10 L/min, thereby obtaining a dry powder. This dry powder was then taken out of the drier, and pulverized by a roll crusher. At this time, pulverizing was conducted by adjusting a roll gap to 0.2 mm and a roll revolution speed to 25 rpm. The pulverized particles of the dry powder were classified by using a vibrating screen having openings of 75 μm and a vibrating screen having openings of 250 μm, thereby obtaining a silica powder having an average particle diameter $D_{50}$ of 140 μm.

The granulated powder was put into a quartz vessel and subjected to firing in the atmospheric air at 1,200° C. for 36 hours, thereby obtaining a silica powder having an average particle diameter $D_{50}$ of 102 μm.

Subsequently, the apparatus 30 shown in FIG. 5 was used to apply a spheroidizing treatment, under an applicable condition shown in Table 2 described below, to the silica powder obtained after firing. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultrapure water were put into a cleaning vessel, to conduct ultrasonic cleaning. After conducting the ultrasonic cleaning, filtration was conducted by a filter having openings of 50 μm. This operation was conducted repetitively until fine particles attached to surfaces of the silica powder particles were fully filtered out.

Finally, the powder after cleaning was charged into a container for drying, then the container for drying was brought into a drier, and drying was conducted by flowing argon at a flow rate of 10 L/min through within the drier, and by holding the powder at a temperature of 250° C. for 24 hours, thereby obtaining a synthetic amorphous silica powder.

Comparative Example 13

Firstly, 5 mols of ultrapure water was prepared per 1 mol of fumed silica having an average particle diameter $D_{50}$ of 0.030 μm and a specific surface area of 50 m²/g. The prepared ultrapure water was charged into a vessel, and then the fumed silica was added thereinto, with stirring while keeping the temperature at 20° C. in an atmosphere of nitrogen. After addition of the fumed silica, stirring was continued for 0.5 hour, thereby producing a siliceous gel. At this time, the stirring speed was set to be 30 rpm. Next, the siliceous gel was transferred into a container for drying which was brought into a drier, and the siliceous gel was dried for 48 hours at a temperature of 200° C. while flowing nitrogen through within the drier at a flow rate of 15 L/min, thereby obtaining a dry powder. This dry powder was then taken out of the drier, and pulverized by a roll crusher. At this time, pulverizing was conducted by adjusting a roll gap to 0.3 mm and a roll revolution speed to 100 rpm. The pulverized particles of the dry powder were classified by using a vibrating screen having openings of 75 μm and a vibrating screen having openings of 250 μm, thereby obtaining a silica powder having an average particle diameter $D_{50}$ of 162 μm.

The granulated powder was put into a quartz vessel and subjected to firing in the atmospheric air at 1,250° C. for 24 hours, thereby obtaining a silica powder having an average particle diameter $D_{50}$ of 111 μm.

Subsequently, the apparatus 30 shown in FIG. 5 was used to apply a spheroidizing treatment, under an applicable condition shown in Table 2 described below, to the silica powder obtained after firing. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultrapure water were put into a cleaning vessel, to conduct ultrasonic cleaning. After conducting the ultrasonic cleaning, filtration was conducted by a filter having openings of 50 μm. This operation was conducted repetitively until fine particles attached to surfaces of the silica powder particles were fully filtered out.

Finally, the powder after cleaning was charged into a container for drying, then the container for drying was brought into a drier, and drying was conducted by flowing nitrogen at a flow rate of 1 L/min through within the drier, and by holding the powder at a temperature of 400° C. for 12 hours, thereby obtaining a synthetic amorphous silica powder.

Comparative Example 14

Firstly, 12 mols of ultrapure water was prepared per 1 mol of fumed silica having an average particle diameter $D_{50}$ of 0.020 μm and a specific surface area of 90 m²/g. The prepared ultrapure water was charged into a vessel, and then the fumed silica was added thereinto, with stirring while keeping the temperature at 30° C. in an atmosphere of nitrogen. After addition of the fumed silica, stirring was continued for 2 hours, thereby producing a siliceous gel. At this time, the stirring speed was set to be 20 rpm. Next, the siliceous gel was transferred into a container for drying which was brought into a drier, and the siliceous gel was dried for 15 hours at a temperature of 250° C. while flowing argon through within the drier at a flow rate of 10 L/min, thereby obtaining a dry powder. This dry powder was then taken out of the drier, and pulverized by a roll crusher. At this time, pulverizing was conducted by adjusting a roll gap to 0.2 mm and a roll revolution speed to 25 rpm. The pulverized particles of the dry powder were classified by using a vibrating screen having openings of 250 μm and a vibrating screen having openings of 75 μm, thereby obtaining a silica powder having an average particle diameter $D_{50}$ of 150 μm.

The granulated powder was put into a quartz vessel and subjected to firing in the atmospheric air at 1,200° C. for 36 hours, thereby obtaining a silica powder having an average particle diameter $D_{50}$ of 110 μm.

Subsequently, the apparatus 30 shown in FIG. 5 was used to apply a spheroidizing treatment, under an applicable condition shown in Table 2 described below, to the silica powder obtained after firing. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultrapure water were put into a cleaning vessel, to conduct ultrasonic cleaning. After conducting the ultrasonic cleaning, filtration was conducted by a filter having openings of 50 μm. This operation was conducted repetitively until fine particles attached to surfaces of the silica powder particles were fully filtered out.

Finally, the powder after cleaning was charged into a container for drying, then the container for drying was brought into a drier, and drying was conducted by flowing nitrogen at a flow rate of 10 L/min through within the drier, and by holding the powder at a temperature of 250° C. for 24 hours, thereby obtaining a synthetic amorphous silica powder.

Comparative Example 15

Firstly, 5 mols of ultrapure water was prepared per 1 mol of fumed silica having an average particle diameter $D_{50}$ of 0.030 μm and a specific surface area of 50 m²/g. The prepared ultrapure water was charged into a vessel, and then the fumed silica was added thereinto, with stirring while keeping the temperature at 20° C. in an atmosphere of nitrogen. After addition of the fumed silica, stirring was continued for 0.5 hour, thereby producing a siliceous gel. At this time, the stirring speed was set to be 30 rpm. Next, the siliceous gel was transferred into a container for drying which was brought into a drier, and the siliceous gel was dried for 48 hours at a temperature of 200° C. while flowing nitrogen through within the drier at a flow rate of 15 L/min, thereby obtaining a dry powder. This dry powder was then taken out of the drier, and pulverized by a roll crusher. At this time, pulverizing was conducted by adjusting a toll gap to 0.3 mm and a roll revolution speed to 100 rpm. The pulverized particles of the dry powder were classified by using a vibrating screen having openings of 75 μm and a vibrating screen having openings of 250 μm, thereby obtaining a silica powder having an average particle diameter $D_{50}$ of 154 μm.

The granulated powder was put into a quartz vessel and subjected to firing in the atmospheric air at 1,250° C. for 24 hours, thereby obtaining a silica powder having an average particle diameter $D_{50}$ of 108 μm.

Subsequently, the apparatus 30 shown in FIG. 5 was used to apply a spheroidizing treatment, under an applicable condition shown in Table 2 described below, to the silica powder obtained after firing. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultrapure water were put into a cleaning vessel, to conduct ultrasonic cleaning. After conducting the ultrasonic cleaning, filtration was conducted by a filter having openings of 50 μm. This operation was conducted repetitively until fine particles attached to surfaces of the silica powder particles were fully filtered out.

Finally, the powder after cleaning was charged into a container for drying, then the container for drying was brought into a drier, and drying was conducted by flowing nitrogen at a flow rate of 1 L/min through within the drier, and by holding the powder at a temperature of 400° C. for 12 hours, thereby obtaining a synthetic amorphous silica powder.

Comparative Example 16

Firstly, 30 mols of ultrapure water was prepared per 1 mol of fumed silica having an average particle diameter $D_{50}$ of 0.007 μm and a specific surface area of 300 m²/g. The prepared ultrapure water was charged into a vessel, and then the fumed silica was added thereinto, with stirring while keeping the temperature at 10° C. in an atmosphere of nitrogen. After addition of the fumed silica, stirring was continued for 6 hours, thereby producing a siliceous gel. At this time, the stirring speed was set to be 50 rpm. Next, the siliceous gel was transferred into a container for drying which was brought into a drier, and the siliceous gel was dried for 12 hours at a temperature of 300° C. while flowing nitrogen through within the drier at a flow rate of 15 L/min, thereby obtaining a dry powder. This dry powder was then taken out of the drier, and pulverized by a roll crusher. At this time, pulverizing was conducted by adjusting a roll gap to 0.5 mm and a roll revolution speed to 100 rpm. The pulverized particles of the dry powder were classified by using a vibrating screen having openings of 300 μm and a vibrating screen having openings of 600 μm, thereby obtaining a silica powder having an average particle diameter $D_{50}$ of 499 μm.

The granulated powder was put into a quartz vessel and subjected to firing in the atmospheric air at 1,300° C. for 72 hours, thereby obtaining a silica powder having an average particle diameter $D_{50}$ of 354 μm.

Subsequently, the apparatus 30 shown in FIG. 5 was used to apply a spheroidizing treatment, under an applicable condition shown in Table 2 described below, to the silica powder obtained after firing. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultrapure water were put into a cleaning vessel, to conduct ultrasonic cleaning. After conducting the ultrasonic cleaning, filtration was conducted by a filter having openings of 200 μm. This operation was conducted repetitively until fine particles attached to surfaces of the silica powder particles were fully filtered out.

Finally, the powder after cleaning was charged into a container for drying, then the container for drying was brought into a drier, and drying was conducted by flowing nitrogen at a flow rate of 10 L/min through within the drier, and by holding the powder at a temperature of 250° C. for 24 hours, thereby obtaining a synthetic amorphous silica powder.

Comparative Example 1

Firstly, 20 mols of ultrapure water was prepared per 1 mol of fumed silica having an average particle diameter $D_{50}$ of 0.007 μm and a specific surface area of 300 m²/g. The prepared ultrapure water was charged into a vessel, and then the fumed silica was added thereinto, with stirring while keeping the temperature at 20° C. in an atmosphere of nitrogen. After addition of the fumed silica, stirring was continued for 6 hours, thereby producing a siliceous gel. At this time, the stirring speed was set to be 50 rpm. Next, the siliceous gel was transferred into a container for drying which was brought into a drier, and the siliceous gel was dried for 24 hours at a temperature of 400° C. while flowing nitrogen through within the drier at a flow rate of 10 L/min, thereby obtaining a dry powder. This dry powder was then taken out of the drier, and pulverized by a roll crusher. At this time, pulverizing was conducted by adjusting a roll gap to 0.5 mm and a roll revolution speed to 50 rpm. The pulverized particles of the dry powder were classified by using a vibrating screen having openings of 300 μm and a vibrating screen having openings of 600 μm, thereby obtaining a silica powder having an average particle diameter $D_{50}$ of 499 μm.

The granulated powder was put into a quartz vessel and subjected to firing in the atmospheric air at 1,200° C. for 48 hours, thereby obtaining a silica powder having an average particle diameter $D_{50}$ of 354 μm.

Subsequently, the apparatus 30 shown in FIG. 5 was used to apply a spheroidizing treatment, under an applicable condition shown in Table 2 described below, to the silica powder obtained after firing. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultrapure water were put into a cleaning vessel, to conduct ultrasonic cleaning. After conducting the ultrasonic cleaning, filtration was conducted by a filter having openings of 200 μm. This operation was conducted repetitively until fine particles attached to surfaces of the silica powder particles were fully filtered out.

Finally, the powder after cleaning was charged into a container for drying, then the container for drying was brought into a drier, and drying was conducted by flowing nitrogen at a flow rate of 10 L/min through within the drier, and by holding the powder at a temperature of 200° C. for 24 hours, thereby obtaining a synthetic amorphous silica powder.

Comparative Example 18

Firstly, 15 mols of ultrapure water was prepared per 1 mol of fumed silica having an average particle diameter $D_{50}$ of 0.016 μm and a specific surface area of 130 $m^2/g$. The prepared ultrapure water was charged into a vessel, and then the fumed silica was added thereinto, with stirring while keeping the temperature at 25° C. in an atmosphere of nitrogen. After addition of the fumed silica, stirring was continued for 4 hours, thereby producing a siliceous gel. At this time, the stirring speed was set to be 20 rpm. Next, the siliceous gel was transferred into a container for drying which was brought into a drier, and the siliceous gel was dried for 36 hours at a temperature of 200° C. while flowing argon through within the drier at a flow rate of 10 L/min, thereby obtaining a dry powder. This dry powder was then taken out of the drier, and pulverized by a roll crusher. At this time, pulverizing was conducted by adjusting a roll gap to 1.0 mm and a roll revolution speed to 50 rpm. The pulverized particles of the dry powder were classified by using a vibrating screen having openings of 450 μm and a vibrating screen having openings of 1, 450 μm, thereby obtaining a silica powder having an average particle diameter $D_{50}$ of 987 μm.

The granulated powder was put into a quartz vessel and subjected to firing in the atmospheric air at 1,450° C. for 72 hours, thereby obtaining a silica powder having an average particle diameter $D_{50}$ of 684 μm.

Subsequently, the apparatus 30 shown in FIG. 5 was used to apply a spheroidizing treatment, under an applicable condition shown in Table 2 described below, to the silica powder obtained after firing. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultrapure water were put into a cleaning vessel, to conduct ultrasonic cleaning. After conducting the ultrasonic cleaning, filtration was conducted by a filter having openings of 350 μm. This operation was conducted repetitively until fine particles attached to surfaces of the silica powder particles were fully filtered out.

Finally, the powder after cleaning was charged into a container for drying, then the container for drying was brought into a drier, and drying was conducted by flowing nitrogen at a flow rate of 10 L/min through within the drier, and by holding the powder at a temperature of 300° C. for 24 hours, thereby obtaining a synthetic amorphous silica powder.

Comparative Example 19

Firstly, 15 mols of ultrapure water was prepared per 1 mol of fumed silica having an average particle diameter $D_{50}$ of 0.016 μm and a specific surface area of 130 $m^2/g$. The prepared ultrapure water was charged into a vessel, and then the fumed silica was added thereinto, with stirring while keeping the temperature at 25° C. in an atmosphere of nitrogen. After addition of the fumed silica, stirring was continued for 4 hours, thereby producing a siliceous gel. At this time, the stirring speed was set to be 20 rpm. Next, the siliceous gel was transferred into a container for drying which was brought into a drier, and the siliceous gel was dried for 36 hours at a temperature of 200° C. while flowing argon through within the drier at a flow rate of 10 L/min, thereby obtaining a dry powder. This dry powder was then taken out of the drier, and pulverized by a roll crusher. At this time, pulverizing was conducted by adjusting a roll gap to 1.0 mm and a roll revolution speed to 50 rpm. The pulverized particles of the dry powder were classified by using a vibrating screen having openings of 450 μm and a vibrating screen having openings of 1, 450 μm, thereby obtaining a silica powder having an average particle diameter $D_{50}$ of 985 μm.

The granulated powder was put into a quartz vessel and subjected to firing in the atmospheric air at 1,450° C. for 72 hours, thereby obtaining a silica powder having an average particle diameter $D_{50}$ of 680 μm.

Subsequently, the apparatus 30 shown in FIG. 5 was used to apply a spheroidizing treatment, under an applicable condition shown in Table 2 described below, to the silica powder obtained after firing. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultrapure water were put into a cleaning vessel, to conduct ultrasonic cleaning. After conducting the ultrasonic cleaning, filtration was conducted by a filter having openings of 350 μm. This operation was conducted repetitively until fine particles attached to surfaces of the silica powder particles were fully filtered out.

Finally, the powder after cleaning was charged into a container for drying, then the container for drying was brought into a drier, and drying was conducted by flowing nitrogen at a flow rate of 10 L/min through within the drier, and by holding the powder at a temperature of 300° C. for 24 hours, thereby obtaining a synthetic amorphous silica powder.

Comparative Example 20

Firstly, ultrapure water was prepared in an amount equivalent to 60 mols, per 1 mol of silicon tetrachloride. This ultrapure water was brought into a vessel, and then the carbon tetrachloride was added thereinto, with stirring while keeping the temperature at 30° C. in an atmosphere of nitrogen, thereby hydrolyzing the silicon tetrachloride. After addition of the silicon tetrachloride, stirring was continued for 4 hours, thereby producing a siliceous gel. At this time, the stirring speed was set to be 250 rpm. Next, the siliceous gel was transferred into a container for drying which was brought into a drier, and the siliceous gel was dried for 24 hours at a temperature of 250° C. while flowing nitrogen through within the drier at a flow rate of 10 L/min, thereby obtaining a dry powder. This dry powder was then taken out of the drier, and pulverized by a roll crusher. At this time, pulverizing was conducted by adjusting a roll gap to 0.2 mm and a roll revolution speed to 150 rpm. The pulverized particles of the dry powder were classified by using a vibrating screen having openings of 50 μm and a vibrating screen having openings of 250 μm, thereby obtaining a silica powder having an average particle diameter $D_{50}$ of 161 μm.

The granulated powder was put into a quartz vessel and subjected to firing in the atmospheric air at 1,350° C. for 24 hours, thereby obtaining a silica powder having an average particle diameter $D_{50}$ of 112 μm.

Subsequently, the apparatus 30 shown in FIG. 5 was used to apply a spheroidizing treatment, under an applicable condition shown in Table 2 described below, to the silica powder obtained after firing. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultrapure water were put into a cleaning vessel, to conduct ultrasonic cleaning. After conducting the ultrasonic cleaning, filtration was conducted by a filter having openings of 50 μm. This operation was conducted repetitively until fine particles attached to surfaces of the silica powder particles were fully filtered out.

Finally, the powder after cleaning was charged into a container for drying, which was then brought into a drier, and drying was conducted by flowing nitrogen at a flow rate of 15 L/min through within the drier, and by holding the powder at a temperature of 150° C. for 48 hours, thereby obtaining a synthetic amorphous silica powder.

Comparative Example 21

Firstly, 1 mol of ultrapure water and 1 mol of ethanol were prepared per 1 mol of tetramethoxysilane. The prepared ultrapure water and ethanol were charged into a vessel, and then the tetramethoxysilane was added thereinto, with stirring while keeping the temperature at 60° C. in an atmosphere of nitrogen, thereby hydrolyzing the tetramethoxysilane. After addition of the tetramethoxysilane, stirring was continued for 60 minutes, and 25 mols of ultrapure water was further added thereinto per 1 mol of tetramethoxysilane, followed by continued stirring for 6 hours, thereby producing a siliceous gel. At this time, the stirring speed was set to be 100 rpm. Next, the siliceous gel was transferred into a container for drying which was brought into a drier, and the siliceous gel was dried for 24 hours at a temperature of 200° C. while flowing nitrogen through within the drier at a flow rate of 20 L/min, thereby obtaining a dry powder. This dry powder was then taken out of the drier, and pulverized by a roll crusher. At this time, pulverizing was conducted by adjusting a roll gap to 0.2 mm and a roll revolution speed to 150 rpm. The pulverized particles of the dry powder were classified by using a vibrating screen having openings of 50 μm and a vibrating screen having openings of 250 μm, thereby obtaining a silica powder having an average particle diameter $D_{50}$ of 164 μm.

The granulated powder was put into a quartz vessel and subjected to firing in the atmospheric air at 1,350° C. for 24 hours, thereby obtaining a silica powder having an average particle diameter $D_{50}$ of 111 μm.

Subsequently, the apparatus 30 shown in FIG. 5 was used to apply a spheroidizing treatment, under an applicable condition shown in Table 2 described below, to the silica powder obtained after firing. Specifically, argon as a working gas was introduced from the gas introducing tube 38 of the apparatus 30, and a high frequency wave was applied to the plasma torch 31 to generate a plasma. After the plasma was stabilized, oxygen was gradually introduced, thereby causing generation of an argon-oxygen plasma. Then, the above obtained silica powder was delivered from the raw material supplying tube 37 into the argon-oxygen plasma to thereby melt the silica powder, such that particles now made into melted bodies were caused to fall and collected by the collecting portion 33, thereby obtaining spheroidized silica powder particles 41.

After the spheroidizing treatment, the powder and ultrapure water were put into a cleaning vessel, to conduct ultrasonic cleaning. After conducting the ultrasonic cleaning, filtration was conducted by a filter having openings of 50 μm. This operation was conducted repetitively until fine particles attached to surfaces of the silica powder particles were fully filtered out.

Finally, the powder after cleaning was charged into a container for drying, which was then brought into a drier, and drying was conducted by flowing nitrogen at a flow rate of 15 L/min through within the drier, and by holding the powder at a temperature of 150° C. for 48 hours, thereby obtaining a synthetic amorphous silica powder.

TABLE 2

| | | Silica powder | | Spheroidizing treatment condition | | | | | |
|---|---|---|---|---|---|---|---|---|---|
| | | Average particle diameter D50 [μm] | | Frequency of high- | High-frequency | Ar gas | Oxygen | Raw powder | |
| | Raw material | Before firing | After firing | frequency wave [MHz] | power A [kW] | flow rate [L/min] | flow rate [L/min] | supplying rate B [kg/hr] | A/B [W · hr/kg] |
| Example 5 | Fumed silica | 141 | 98 | 3 | 30 | 15 | 35 | 3.2 | $9.4 \times 10^3$ |
| Example 6 | Fumed silica | 156 | 106 | 4 | 50 | 20 | 75 | 7.1 | $7.0 \times 10^3$ |

TABLE 2-continued

| | Silica powder | | | Spheroidizing treatment condition | | | | | |
|---|---|---|---|---|---|---|---|---|---|
| | | Average particle diameter D50 [μm] | | Frequency of high- | High- frequency | Ar gas | Oxygen | Raw powder | |
| | Raw material | Before firing | After firing | frequency wave [MHz] | power A [kW] | flow rate [L/min] | flow rate [L/min] | supplying rate B [kg/hr] | A/B [W · hr/kg] |
| Example 7 | Fumed silica | 502 | 350 | 5 | 70 | 25 | 70 | 12.5 | $5.6 \times 10^3$ |
| Example 8 | Fumed silica | 987 | 691 | 5 | 80 | 40 | 110 | 20.1 | $4.0 \times 10^3$ |
| Example 9 | Silicon tetrachloride | 148 | 111 | 4 | 50 | 25 | 70 | 6.9 | $7.2 \times 10^3$ |
| Example 10 | Tetramethoxysilane | 163 | 115 | 4 | 50 | 25 | 70 | 7.4 | $6.8 \times 10^3$ |
| Comparative Example 12 | Fumed silica | 140 | 102 | 5 | 120 | 55 | 115 | 10.4 | $1.2 \times 10^4$ |
| Comparative Example 13 | Fumed silica | 162 | 111 | 5 | 120 | 55 | 130 | 41.6 | $2.9 \times 10^3$ |
| Comparative Example 14 | Fumed silica | 150 | 110 | 2 | 90 | 35 | 60 | 36.2 | $2.5 \times 10^3$ |
| Comparative Example 15 | Fumed silica | 154 | 108 | 2 | 60 | 25 | 75 | 21.1 | $2.8 \times 10^3$ |
| Comparative Example 16 | Fumed silica | 499 | 354 | 4 | 30 | 25 | 30 | 1.1 | $2.7 \times 10^4$ |
| Comparative Example 17 | Fumed silica | 499 | 354 | 4 | 30 | 15 | 40 | 10.4 | $2.9 \times 10^3$ |
| Comparative Example 18 | Fumed silica | 987 | 684 | 2 | 30 | 25 | 20 | 2.2 | $1.4 \times 10^4$ |
| Comparative Example 19 | Fumed silica | 985 | 680 | 2 | 30 | 15 | 50 | 11.3 | $2.7 \times 10^3$ |
| Comparative Example 20 | Silicon tetrachloride | 161 | 112 | 5 | 120 | 60 | 125 | 43.1 | $2.8 \times 10^3$ |
| Comparative Example 21 | Tetramethoxysilane | 164 | 111 | 5 | 120 | 60 | 125 | 45.6 | $2.6 \times 10^3$ |

Measured for the powders obtained in Examples 1 to 10 and Comparative Examples 1 to 21, were an average particle diameter $D_{50}$, a BET specific surface area, a theoretical specific surface area, a quotient represented by "BET specific surface area/theoretical specific surface area", a real density, an intra-particulate porosity, a circularity, and a spheroidization ratio, by those techniques to be described hereinafter. These results are listed in Table 3 or Table 4.

(1) Average particle diameter $D_{50}$: this was obtained by calculating an average value of medians of particle distributions (diameter) measured three times by Laser Diffraction/Scattering Particle Size Distribution Analyzer (Model Name: HORIBA LA-950).

(2) BET specific surface area: this was measured by a BET three-point method by using a measuring apparatus (QUAN-TACHROME AUTOSORB-1 MP). The BET three-point method is configured to obtain a gradient A from adsorbed nitrogen amounts at three points of relative pressure, thereby obtaining a specific surface area value based on a BET equation. Measurement of adsorbed nitrogen amounts was conducted under a condition of 150° C. for 60 minutes.

(3) Theoretical specific surface area: this was calculated from the following equation (2), assuming that D represents an average particle diameter $D_{50}$ of a powder, and p represents a real density of 2.2 g/cm³ in the following equation (1):

$$\text{Theoretical specific surface area} = 6/(D \times \rho) \quad (1)$$

$$\text{Theoretical specific surface area of powder} = 2.73/D_{50} \quad (2)$$

(4) Quotient of "BET specific surface area/theoretical specific surface area": this was calculated from the BET specific surface area and the theoretical specific surface area measured and obtained in the above manners, respectively.

(5) Real density: this was calculated as an average value of true densities obtained by conducting a real density measurement three times in conformity to JIS R7212: Testing Methods for Carbon Blocks, (d) Measurement of absolute specific gravity.

(6) Intra-particulate porosity: the obtained powder was embedded in a resin which was then ground to expose cross sections of powder particles. The cross sections of powder particles were observed by a SEM (scanning electron microscope). Further, the intra-particulate porosity was calculated from the following equation (4), by measuring cross-sectional areas of 50 powder particles, and areas of spaces in the particles, if present:

$$\text{Intra-particulate porosity} = \text{total area of spaces in particles/total cross-sectional area of particles} \quad (4)$$

Figure 6:
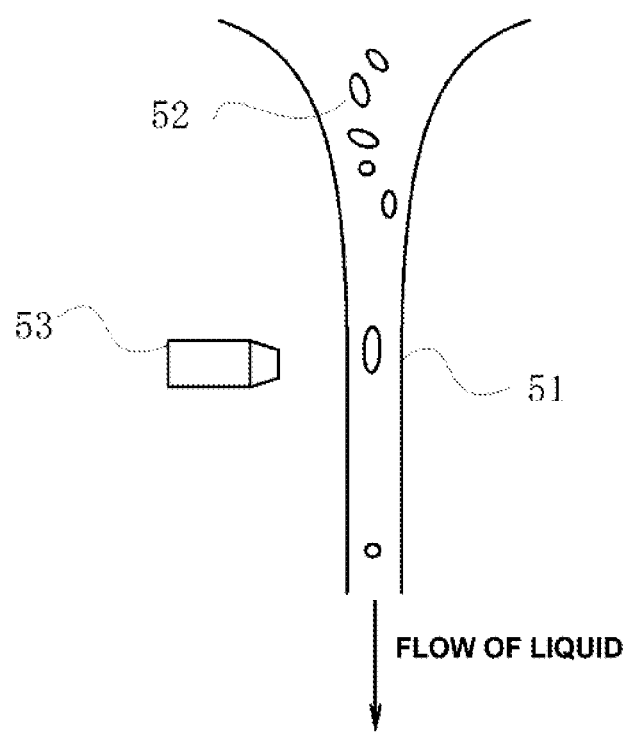
FIG. 6 is a schematic view of a particle size/shape distribution measuring device.

(7) Spheroidization ratio and Circularity: these were measured two times by a particle size/shape distribution measuring device (PITA-1 manufactured by SEISHIN ENTERPRISE Co., Ltd.) shown in FIG. 6, respectively, and average values thereof were calculated, respectively. Specifically, powder particles were firstly dispersed into a liquid, which was then flowed through a planar elongational flow cell 51. Recorded as images by an objective lens 53 were 200 powder particles 52 moving through within the planar elongational flow cell 51, respectively, thereby calculating a circularity from the recorded images and the following equation (3). In the equation (3), S represents an area of each recorded particle image in a projection view, and L represents a perimeter of the particle image in the projection view. The circularity of the applicable powder was provided as an average value of circularities of 200 particles calculated in the above manner.

$$\text{Circularity} = 4\pi S/L^2 \quad (3)$$

The spheroidization ratio is a ratio of those powder particles included in 200 powder particles, which have circularities falling into a range between 0.60 and 1.00.

TABLE 3

|  | Average particle diameter D50 [μm] | BET specific surface area [m2/g] | Theoretical specific surface area [m2/g] | Quotient of BET specific surface area/theoretical specific surface area | Real density [g/cm3] | Intra-particulate porosity | Circularity | Spheroidization ratio |
|---|---|---|---|---|---|---|---|---|
| Example 1 | 101 | 0.037 | 0.027 | 1.37 | 2.19 | 0.01 | 0.75 | 0.53 |
| Example 2 | 107 | 0.037 | 0.026 | 1.42 | 2.17 | 0.02 | 0.71 | 0.47 |
| Example 3 | 387 | 0.011 | 0.007 | 1.57 | 2.15 | 0.03 | 0.61 | 0.32 |
| Example 4 | 716 | 0.007 | 0.004 | 1.75 | 2.12 | 0.05 | 0.5 | 0.23 |
| Comparative Example 1 | 112 | 0.031 | 0.024 | 1.29 | 2.18 | 0.01 | 0.75 | 0.52 |
| Comparative Example 2 | 92 | 0.055 | 0.030 | 1.83 | 2.12 | 0.04 | 0.53 | 0.20 |
| Comparative Example 3 | 98 | 0.038 | 0.028 | 1.36 | 2.05 | 0.05 | 0.73 | 0.50 |
| Comparative Example 4 | 353 | 0.012 | 0.008 | 1.50 | 2.16 | 0.08 | 0.67 | 0.41 |
| Comparative Example 5 | 367 | 0.009 | 0.007 | 1.29 | 2.18 | 0.02 | 0.78 | 0.54 |
| Comparative Example 6 | 398 | 0.012 | 0.007 | 1.71 | 2.13 | 0.04 | 0.42 | 0.21 |
| Comparative Example 7 | 731 | 0.006 | 0.004 | 1.50 | 2.15 | 0.03 | 0.71 | 0.61 |
| Comparative Example 8 | 654 | 0.007 | 0.004 | 1.75 | 2.11 | 0.05 | 0.55 | 0.17 |
| Comparative Example 9 | 70 | 0.142 | 0.039 | 3.64 | 2.19 | 0.01 | — | — |
| Comparative Example 10 | 412 | 0.019 | 0.007 | 2.71 | 2.20 | 0.00 | — | — |
| Comparative Example 11 | 627 | 0.017 | 0.004 | 4.25 | 2.18 | 0.02 | — | — |

TABLE 4

|  | Average particle diameter D50 [μm] | BET specific surface area [m2/g] | Theoretical specific surface area [m2/g] | Quotient of BET specific surface area/theoretical specific surface area | Real density [g/cm3] | Intra-particulate porosity | Circularity | Spheroidization ratio |
|---|---|---|---|---|---|---|---|---|
| Example 5 | 108 | 0.035 | 0.025 | 1.4 | 2.2 | 0.01 | 0.75 | 0.53 |
| Example 6 | 112 | 0.034 | 0.024 | 1.42 | 2.19 | 0.02 | 0.71 | 0.47 |
| Example 7 | 378 | 0.011 | 0.007 | 1.57 | 2.15 | 0.03 | 0.61 | 0.32 |
| Example 8 | 726 | 0.007 | 0.004 | 1.75 | 2.11 | 0.05 | 0.5 | 0.23 |
| Example 9 | 118 | 0.032 | 0.023 | 1.39 | 2.19 | 0.02 | 0.7 | 0.45 |
| Example 10 | 120 | 0.033 | 0.023 | 1.43 | 2.18 | 0.03 | 0.68 | 0.41 |
| Comparative Example 12 | 111 | 0.032 | 0.025 | 1.28 | 2.18 | 0.01 | 0.75 | 0.75 |
| Comparative Example 13 | 121 | 0.042 | 0.023 | 1.83 | 2.12 | 0.04 | 0.53 | 0.53 |
| Comparative Example 14 | 120 | 0.032 | 0.023 | 1.39 | 2.05 | 0.05 | 0.73 | 0.73 |
| Comparative Example 15 | 118 | 0.034 | 0.023 | 1.48 | 2.16 | 0.08 | 0.67 | 0.67 |
| Comparative Example 16 | 386 | 0.009 | 0.007 | 1.29 | 2.18 | 0.02 | 0.78 | 0.78 |
| Comparative Example 17 | 386 | 0.012 | 0.007 | 1.71 | 2.13 | 0.04 | 0.42 | 0.42 |
| Comparative Example 18 | 746 | 0.006 | 0.004 | 1.5 | 2.15 | 0.03 | 0.71 | 0.71 |
| Comparative Example 19 | 741 | 0.007 | 0.004 | 1.75 | 2.11 | 0.05 | 0.55 | 0.55 |
| Comparative Example 20 | 122 | 0.03 | 0.022 | 1.36 | 2.19 | 0.01 | 0.72 | 0.7 |
| Comparative Example 21 | 121 | 0.032 | 0.023 | 1.39 | 2.18 | 0.01 | 0.7 | 0.69 |

<Evaluation 1>

Impurity concentrations of the powders obtained in Examples 1 to 10 and Comparative Examples 1 to 21 were analyzed or measured by the following techniques (1) to (5). The results thereof are listed in Table 5 or Table 6.

(1) Na, K, Ca, Fe, Al, and P: Each powder was thermally decomposed with hydrofluoric acid and sulfuric acid, in a manner to prepare a constant-volume liquid by using dilute nitric acid after thermal condensation. This constant-volume liquid was subjected to analysis by a High-Frequency Inductive Coupling Plasma Mass Spectrometer (Model Name: SPQ9000 of SII NanoTechnology Inc.).

(2) B: Each powder was thermally decomposed with hydrofluoric acid, in a manner to prepare a constant-volume liquid by using ultrapure water after thermal condensation This constant-volume liquid was subjected to analysis by a High-Frequency Inductive Coupling Plasma Mass Spectrometer (Model Name: SPQ9000 of SII NanoTechnology Inc.)

(3) C: Added to each powder were iron, tungsten, and tin as combustion improvers, to thereby conduct analysis by a high-frequency furnace combustion infrared absorption method (Model Name: HORIBA EMIA-920V).

(4) Cl: Each synthetic amorphous silica powder was mixed with ultrapure water, in a manner to cause Cl to leach out of the former into the latter, under ultrasonic waves. The synthetic amorphous silica powder and the leach solution were separated from each other by a centrifuge, and the separated leach solution was subjected to analysis by ion chromatography (Model Name: Dionex DX-500).

(5) OH: Measurement therefor was conducted by a peak height near 3,660 cm$^{-1}$ by Fourier Transformation Infrared spectrophotometer (Model Name: ThermoFischer Nicolet 4700FT-IR).

TABLE 5

| | Impurity concentration of powder [wt · ppm] | | | | | | | | | |
|---|---|---|---|---|---|---|---|---|---|---|
| | Na | K | Ca | Fe | Al | B | C | P | Cl | OH |
| Example 1 | <0.01 | <0.01 | 0.05 | 0.1 | 0.1 | <0.01 | 2 | <0.01 | 3 | 43 |
| Example 2 | <0.01 | <0.01 | 0.05 | 0.1 | 0.1 | <0.01 | 4 | <0.01 | <1 | 50 |
| Example 3 | <0.01 | <0.01 | 0.05 | 0.1 | 0.1 | <0.01 | 2 | <0.01 | 2 | 60 |
| Example 4 | <0.01 | <0.01 | 0.05 | 0.1 | 0.1 | <0.01 | 2 | <0.01 | 3 | 51 |
| Comparative Example 1 | <0.01 | <0.01 | 0.05 | 0.1 | 0.1 | <0.01 | 2 | <0.01 | 5 | 60 |
| Comparative Example 2 | <0.01 | <0.01 | 0.05 | 0.1 | 0.1 | <0.01 | 2 | <0.01 | 4 | 60 |
| Comparative Example 3 | <0.01 | <0.01 | 0.05 | 0.1 | 0.1 | <0.01 | 7 | <0.01 | <1 | 65 |
| Comparative Example 4 | <0.01 | <0.01 | 0.05 | 0.1 | 0.1 | <0.01 | 2 | <0.01 | 6 | 59 |
| Comparative Example 5 | <0.01 | <0.01 | 0.05 | 0.1 | 0.1 | <0.01 | 2 | <0.01 | 6 | 63 |
| Comparative Example 6 | <0.01 | <0.01 | 0.05 | 0.1 | 0.1 | <0.01 | 2 | <0.01 | 4 | 73 |
| Comparative Example 7 | <0.01 | <0.01 | 0.05 | 0.1 | 0.1 | <0.01 | 2 | <0.01 | 5 | 71 |
| Comparative Example 8 | <0.01 | <0.01 | 0.05 | 0.1 | 0.1 | <0.01 | 2 | <0.01 | 4 | 70 |
| Comparative Example 9 | <0.01 | <0.01 | 0.05 | 0.1 | 0.1 | <0.01 | 2 | <0.01 | 8 | 97 |
| Comparative Example 10 | <0.01 | <0.01 | 0.05 | 0.1 | 0.1 | <0.01 | 11 | <0.01 | <1 | 83 |
| Comparative Example 11 | <0.01 | <0.01 | 0.05 | 0.1 | 0.1 | <0.01 | 5 | <0.01 | 7 | 115 |

As apparent from Table 5, it is seen that Examples 1 to 4 were each relatively low in concentration of hydroxyl group and carbon which possibly act as gas components acting as sources of generation or expansion of gas bubbles in a synthetic silica glass product at a high temperature and a reduced pressure, as compared to Comparative Examples 1 to 11.

TABLE 6

| | Impurity concentration of powder [wt · ppm] | | | | | | | | | |
|---|---|---|---|---|---|---|---|---|---|---|
| | Na | K | Ca | Fe | Al | B | C | P | Cl | OH |
| Example 5 | <0.01 | <0.01 | 0.05 | 0.1 | 0.1 | <0.01 | <2 | <0.01 | <2 | 21 |
| Example 6 | <0.01 | <0.01 | 0.05 | 0.1 | 0.1 | <0.01 | <2 | <0.01 | <2 | 23 |
| Example 7 | <0.01 | <0.01 | 0.05 | 0.1 | 0.1 | <0.01 | <2 | <0.01 | <2 | 25 |
| Example 8 | <0.01 | <0.01 | 0.05 | 0.1 | 0.1 | <0.01 | <2 | <0.01 | <2 | 31 |
| Example 9 | <0.01 | <0.01 | 0.05 | 0.1 | 0.1 | <0.01 | <2 | <0.01 | 3 | 53 |
| Example 10 | <0.01 | <0.01 | 0.05 | 0.1 | 0.1 | <0.01 | 3 | <0.01 | <2 | 42 |
| Comparative Example 12 | <0.01 | <0.01 | 0.05 | 0.1 | 0.1 | <0.01 | <2 | <0.01 | <2 | 25 |
| Comparative Example 13 | <0.01 | <0.01 | 0.05 | 0.1 | 0.1 | <0.01 | <2 | <0.01 | <2 | 31 |
| Comparative Example 14 | <0.01 | <0.01 | 0.05 | 0.1 | 0.1 | <0.01 | <2 | <0.01 | <2 | 33 |
| Comparative Example 15 | <0.01 | <0.01 | 0.05 | 0.1 | 0.1 | <0.01 | <2 | <0.01 | <2 | 35 |
| Comparative Example 16 | <0.01 | <0.01 | 0.05 | 0.1 | 0.1 | <0.01 | <2 | <0.01 | <2 | 37 |
| Comparative Example 17 | <0.01 | <0.01 | 0.05 | 0.1 | 0.1 | <0.01 | <2 | <0.01 | <2 | 33 |
| Comparative Example 18 | <0.01 | <0.01 | 0.05 | 0.1 | 0.1 | <0.01 | <2 | <0.01 | <2 | 35 |

TABLE 6-continued

| | Impurity concentration of powder [wt · ppm] | | | | | | | | | |
|---|---|---|---|---|---|---|---|---|---|---|
| | Na | K | Ca | Fe | Al | B | C | P | Cl | OH |
| Comparative Example 19 | <0.01 | <0.01 | 0.05 | 0.1 | 0.1 | <0.01 | <2 | <0.01 | <2 | 37 |
| Comparative Example 20 | <0.01 | <0.01 | 0.05 | 0.1 | 0.1 | <0.01 | <2 | <0.01 | 2 | 41 |
| Comparative Example 21 | <0.01 | <0.01 | 0.05 | 0.1 | 0.1 | <0.01 | 2 | <0.01 | <2 | 48 |

As apparent from Table 6, it is seen that: the synthetic amorphous silica powders each adopting a powder as a raw material obtained by reacting silicon tetrachloride in a liquid, were less than 2 ppm in carbon concentration; the synthetic amorphous silica powders each adopting a powder as a raw material obtained from an organic silicon compound, were less than 2 ppm in chlorine concentration; and the synthetic amorphous silica powders each adopting a powder as a raw material obtained from fumed silica, were less than 2 ppm in carbon concentration and less than 2 ppm in chlorine concentration.

<Comparative Test and Evaluation 2>

The powders obtained in Examples 1 to 10 and Comparative Examples 1 to 21 were used to fabricate rectangular parallelepiped block materials of length 20 mm×width 20 mm×height 40 mm, respectively, in a manner to evaluate the number of gas bubbles caused in each block material. These results are listed in Table 7 or Table 8. Specifically, each block material was fabricated by: introducing the applicable powder into a carbon crucible; heating it by a carbon heater to 2,200° C. in a vacuum atmosphere at $2.0 \times 10^4$ Pa; and holding it for 48 hours. Conducted for this block material was a heat treatment at a temperature of 1,600° C. for 48 hours in a vacuum atmosphere of $5.0 \times 10^2$ Pa. After the heat treatment, the block material was cut out at a height of 20 mm to expose a rectangular cross section of 20 mm×20 mm which was then ground, in a manner to evaluate the number of gas bubbles observed in a region having a depth of 2 mm from the surface (cross section) of the block material, and a width of 2 mm.

<Comparative Test and Evaluation 3>

Filled into a mold for manufacturing a quartz crucible of 16-inch diameter, were a natural quartz powder by a depth of about 8 mm, and an applicable one of the powders obtained in Examples 1 to 10 and Comparative Examples 1 to 21 by a depth of about 2.5 mm. Placed was an arc electrode such that a tip end of the electrode was arranged at a position (at the same level as an upper end surface of the mold) which position was on a central axis of the mold and which position was 400 mm above a bottom surface of the mold. The arc electrode was subjected to energization therethrough at an electric power of 200 kW for 5 minutes while rotating the mold at a predetermined speed, thereby melting the quartz powders. Next, the arc electrode was lowered by 200 mm, and energized therethrough by the same electric power for 8 minutes to mainly heat the quartz near the bottom center in the mold, in a manner to reduce a pressure from the mold side during energization for 6 minutes.

Each of the obtained crucibles was cut, and subjected to grinding of its cross section. The amorphous silica layers formed from the powders obtained in Examples 1 to 10 and Comparative Examples 1 to 21 were each measured by a microscope for a thickness of a portion which was 10 cm distant from an upper end of each quartz crucible. These results are listed in Table 7 or Table 8. It is noted that thicknesses of amorphous silica layers closer to 2.5 mm are more preferable in Table 7 or Table 8.

TABLE 7

| | Evaluation | |
|---|---|---|
| | Number of gas bubbles [count] | Thickness of amorphous silica layer [mm] |
| Example 1 | 48 | 1.6 |
| Example 2 | 52 | 1.7 |
| Example 3 | 59 | 1.8 |
| Example 4 | 63 | 2.0 |
| Comparative Example 1 | 42 | 0.7 |
| Comparative Example 2 | 92 | 1.9 |
| Comparative Example 3 | 108 | 1.5 |
| Comparative Example 4 | 97 | 1.2 |
| Comparative Example 5 | 36 | 0.4 |
| Comparative Example 6 | 101 | 1.8 |
| Comparative Example 7 | 17 | 0.3 |
| Comparative Example 8 | 93 | 1.9 |
| Comparative Example 9 | 97 | 1.7 |
| Comparative Example 10 | 83 | 1.8 |
| Comparative Example 11 | 115 | 1.6 |

As apparent from Table 7, it is seen that the blocks fabricated by using the powders of Examples 1 to 4, respectively, were remarkably decreased in the number of caused gas bubbles, as compared to the blocks fabricated by using the powders of Comparative Examples 9 to 11 without subjecting to a spheroidizing treatment, respectively.

Further, it is seen that, comparing Examples 1 to 4 with Comparative Examples 1 to 8, Examples 1 to 4 were remarkably decreased in the number of caused gas bubbles as compared to Comparative Examples 2 to 4, Comparative Examples 6 and 8 though these Examples and Comparative Examples were each subjected to a spheroidizing treatment. In turn, although Comparative Examples 1, 5, and 7 were remarkably decreased in the number of caused gas bubbles as compared to Examples 1 to 4, these Comparative Examples were each considerably decreased in thickness of the amorphous silica layer to thereby fail to form the amorphous silica layer at a desired thickness.

TABLE 8

|  | Evaluation | |
| --- | --- | --- |
|  | Number of gas bubbles [count] | Thickness of amorphous silica layer [mm] |
| Example 5 | 33 | 1.6 |
| Example 6 | 42 | 1.7 |
| Example 7 | 48 | 1.9 |
| Example 8 | 51 | 2.0 |
| Example 9 | 39 | 1.8 |
| Example 10 | 44 | 1.8 |
| Comparative Example 12 | 32 | 0.7 |
| Comparative Example 13 | 82 | 1.9 |
| Comparative Example 14 | 97 | 1.6 |
| Comparative Example 15 | 84 | 1.7 |
| Comparative Example 16 | 26 | 0.4 |
| Comparative Example 17 | 91 | 1.8 |
| Comparative Example 18 | 35 | 0.3 |
| Comparative Example 19 | 83 | 1.7 |
| Comparative Example 20 | 95 | 1.8 |
| Comparative Example 21 | 97 | 1.7 |

As apparent from Table 1 to Table 8, it is seen that the blocks fabricated by using the powders of Examples 5 to 10 which were fired under predetermined conditions before spheroidizing treatments, respectively, were further decreased in the number of caused gas bubbles in relation to a thickness of the amorphous silica layer, as compared to the blocks fabricated by using the powders of Examples 1 to 4 without subjecting to firing, respectively.

Further, comparing Examples 5 to 8 with Comparative Examples 13 to 15, 17, and 19, Example 9 with Comparative Example 20, and Example 10 with Comparative Example 21, it is seen therefrom that Examples 5 to 8, Example 9, and Example 10 were remarkably decreased in the number of caused gas bubbles, as compared to Comparative Examples 13 to 15, 17, 19, Comparative Example 20, and Comparative Example 21, though these Examples and Comparative Examples were each subjected to a spheroidizing treatment. In turn, although Comparative Examples 12, 16, and 18 were remarkably decreased in the number of caused gas bubbles as compared to Examples 5 to 8, these Comparative Examples were each considerably decreased in thickness of the amorphous silica layer to thereby fail to form the amorphous silica layer at a desired thickness. It is seen therefrom that the synthetic amorphous silica powders of the present invention are each remarkably enhanced in effect for reducing an amount of generation or degree of expansion of gas bubbles, and are improved in moldability, so that the powders are each suitable as a raw material for manufacturing a synthetic silica glass product.

INDUSTRIAL APPLICABILITY

The synthetic amorphous silica powder of the present invention is preferably usable as a raw material for manufacturing a synthetic silica glass product such as a crucible, jig, and the like to be used for single crystal production in semiconductor application.

The invention claimed is:

1. A synthetic amorphous silica powder obtained by applying a spheroidizing treatment to a granulated silica powder, and by subsequently cleaning and drying it so that the synthetic amorphous silica powder has an average particle diameter $D_{50}$ of 10 to 2,000 μm;
   wherein the synthetic amorphous silica powder has:
   a quotient between 1.35 exclusive and 1.75 inclusive obtained by dividing a BET specific surface area of the powder by a theoretical specific surface area calculated from the average particle diameter $D_{50}$;
   a real density of 2.10 to 2.20 $g/cm^3$;
   an intra-particulate porosity of 0 to 0.05;
   a circularity between 0.50 inclusive and 0.75 inclusive; and
   a spheroidization ratio between 0.20 inclusive and 0.55 exclusive.

2. The synthetic amorphous silica powder according to claim 1, wherein the synthetic amorphous silica powder is obtained by applying the spheroidizing treatment to the granulated silica powder after firing it; and
   wherein the synthetic amorphous silica powder satisfies one or both of the conditions that it has a carbon concentration less than 2 ppm and that it has a chlorine concentration less than 2 ppm.

3. The synthetic amorphous silica powder according to claim 2, wherein the granulated silica powder is a silica powder obtained by: hydrolyzing silicon tetrachloride to produce a siliceous gel; drying the siliceous gel to turn it into a dry powder; pulverizing particles of the dry powder; and then classifying the pulverizedly obtained particles; and
   wherein the synthetic amorphous silica powder has a carbon concentration less than 2 ppm.

4. The synthetic amorphous silica powder according to claim 2, wherein the granulated silica powder is a silica powder obtained by: hydrolyzing an organic silicon compound to produce a siliceous gel; drying the siliceous gel to turn it into a dry powder; pulverizing particles of the dry powder; and then classifying the pulverizedly obtained particles; and
   wherein the synthetic amorphous silica powder has a chlorine concentration less than 2 ppm.

5. The synthetic amorphous silica powder according to claim 2, wherein the granulated silica powder is a silica powder obtained by: using a fumed silica to produce a siliceous gel; drying the siliceous gel to turn it into a dry powder; pulverizing particles of the dry powder; and then classifying the pulverizedly obtained particles; and
   wherein the synthetic amorphous silica powder has a carbon concentration less than 2 ppm and a chlorine concentration less than 2 ppm.

6. A method for producing a synthetic amorphous silica powder, comprising, in the recited order:
   a granulating step for producing a siliceous gel, drying the siliceous gel to turn it into a dry powder, pulverizing particles of the dry powder, and then classifying the pulverizedly obtained particles to thereby obtain a silica powder;
   a spheroidizing step based on a thermal plasma for delivering, at a predetermined supplying rate, particles of the silica powder obtained in the granulating step into a plasma torch in which a plasma is generated by a predetermined high-frequency power, in a manner to heat the particles at a temperature from 2,000° C. to a boiling point of silicon dioxide, thereby melting the particles;
   a cleaning step for removing fine particles attached to surfaces of the spheroidized silica powder particles after the spheroidizing step; and a drying step for drying the silica powder particles after the cleaning step;

wherein the spheroidizing step is conducted by adjusting a value of A/B (W·hr/kg) to between $3.0 \times 10^3$ inclusive and $1.0 \times 10^4$ exclusive, where A is the high-frequency power (W), and B is the supplying rate (kg/hr) of the silica powder, thereby obtaining a synthetic amorphous silica powder having:

an average particle diameter $D_{50}$ of 10 to 2,000 μm;

a quotient between 1.35 exclusive and 1.75 inclusive obtained by dividing a BET specific surface area of the powder by a theoretical specific surface area calculated from the average particle diameter $D_{50}$;

a real density of 2.10 to 2.20 g/cm$^3$;

an intra-particulate porosity of 0 to 0.05;

a circularity between 0.50 inclusive and 0.75 inclusive; and a spheroidization ratio between 0.20 inclusive and 0.55 exclusive.

7. The method for producing a synthetic amorphous silica powder according to claim 6, wherein the granulating step is a step for: hydrolyzing silicon tetrachloride to produce a siliceous gel; drying the siliceous gel to turn it into a dry powder; pulverizing particles of the dry powder; and then classifying the pulverizedly obtained particles, to obtain a silica powder having an average particle diameter $D_{50}$ of 10 to 3,000 μm.

8. The method for producing a synthetic amorphous silica powder according to claim 6, wherein the granulating step is a step for: hydrolyzing an organic silicon compound to produce a siliceous gel; drying the siliceous gel to turn it into a dry powder; pulverizing particles of the dry powder; and then classifying the pulverizedly obtained particles, to obtain a silica powder having an average particle diameter $D_{50}$ of 10 to 3,000 μm.

9. The method for producing a synthetic amorphous silica powder according to claim 6, wherein the granulating step is a step for: using a fumed silica to produce a siliceous gel; drying the siliceous gel to turn it into a dry powder; pulverizing particles of the dry powder; and then classifying the pulverizedly obtained particles, to obtain a silica powder having an average particle diameter $D_{50}$ of 10 to 3,000 μm.

10. A method for producing a synthetic amorphous silica powder, comprising, in the recited order:

a granulating step for producing a siliceous gel, drying the siliceous gel to turn it into a dry powder, pulverizing particles of the dry powder, and then classifying the pulverizedly obtained particles to thereby obtain a silica powder;

a firing step for firing particles of the silica powder obtained in the granulating step, at a temperature of 800 to 1,450° C.;

a spheroidizing step based on a thermal plasma for delivering, at a predetermined supplying rate, particles of the silica powder obtained in the firing step into a plasma torch in which a plasma is generated by a predetermined high-frequency power, in a manner to heat the particles at a temperature from 2,000° C. to a boiling point of silicon dioxide, thereby melting the particles;

a cleaning step for removing fine particles attached to surfaces of the spheroidized silica powder particles after the spheroidizing step; and a drying step for drying the silica powder particles after the cleaning step;

wherein the spheroidizing step is conducted by adjusting a value of A/B (W·hr/kg) to between $3.0 \times 10^3$ inclusive and $1.0 \times 10^4$ exclusive, where A is the high-frequency power (W), and B is the supplying rate (kg/hr) of the silica powder, thereby obtaining a synthetic amorphous silica powder having:

an average particle diameter $D_{50}$ of 10 to 2,000 μm;

a quotient between 1.35 exclusive and 1.75 inclusive obtained by dividing a BET specific surface area of the powder by a theoretical specific surface area calculated from the average particle diameter $D_{50}$;

a real density of 2.10 to 2.20 g/cm$^3$;

an intra-particulate porosity of 0 to 0.05;

a circularity between 0.50 inclusive and 0.75 inclusive; and a spheroidization ratio between 0.20 inclusive and 0.55 exclusive; and wherein the synthetic amorphous silica powder satisfies one or both of the conditions that it has a carbon concentration less than 2 ppm and that it has a chlorine concentration less than 2 ppm.

11. The method for producing a synthetic amorphous silica powder according to claim 10, wherein, when the granulating step is a step for: hydrolyzing silicon tetrachloride to produce a siliceous gel; drying the siliceous gel to turn it into a dry powder; pulverizing particles of the dry powder; and then classifying the pulverizedly obtained particles, to obtain a silica powder having an average particle diameter $D_{50}$ of 10 to 3,000 μm, the obtained synthetic amorphous silica powder has a carbon concentration less than 2 ppm.

12. The method for producing a synthetic amorphous silica powder according to claim 10, wherein, when the granulating step is a step for: hydrolyzing an organic silicon compound to produce a siliceous gel; drying the siliceous gel to turn it into a dry powder; pulverizing particles of the dry powder; and then classifying the pulverizedly obtained particles, to obtain a silica powder having an average particle diameter $D_{50}$ of 10 to 3,000 μm, the obtained synthetic amorphous silica powder has a chlorine concentration less than 2 ppm.

13. The method for producing a synthetic amorphous silica powder according to claim 10, wherein, when the granulating step is a step for: using a fumed silica to produce a siliceous gel; drying the siliceous gel to turn it into a dry powder; pulverizing particles of the dry powder; and then classifying the pulverizedly obtained particles, to obtain a silica powder having an average particle diameter $D_{50}$ of 10 to 3,000 mm, the obtained synthetic amorphous silica powder has a carbon concentration less than 2 ppm and a chlorine concentration less than 2 ppm.

* * * * *